(12) United States Patent
Kaspar et al.

(10) Patent No.: US 8,516,147 B2
(45) Date of Patent: Aug. 20, 2013

(54) DATA SEGMENTATION, REQUEST AND TRANSFER METHOD

(75) Inventors: Dominik Kaspar, Oslo (NO); Kristian R. Evensen, Blommenholm (NO); Paal E. Engelstad, Snarøya (NO); Audun F. Hansen, Oslo (NO); Carsten Griwodz, Skedsmokorset (NO); Pål Halvorsen, Finstadjordet (NO)

(73) Assignee: Simula Innovation SA, Fornebu (NO)

( * ) Notice: Subject to any disclaimer, the term of this patent is extended or adjusted under 35 U.S.C. 154(b) by 622 days.

(21) Appl. No.: 12/713,939

(22) Filed: Feb. 26, 2010

(65) Prior Publication Data

US 2011/0213827 A1   Sep. 1, 2011
US 2012/0011191 A2   Jan. 12, 2012

(51) Int. Cl.
*G06F 15/173* (2006.01)

(52) U.S. Cl.
USPC ........... 709/236; 709/235; 709/233; 709/232; 709/230; 709/203; 709/219

(58) Field of Classification Search
USPC ................ 709/236, 232, 230, 203, 217–219, 709/235, 233
See application file for complete search history.

(56) References Cited

U.S. PATENT DOCUMENTS

| | | | | |
|---|---|---|---|---|
| 5,953,506 A * | 9/1999 | Kalra et al. | .................. | 709/231 |
| 6,128,483 A * | 10/2000 | Doiron et al. | ................. | 455/419 |
| 6,564,251 B2 * | 5/2003 | Katariya et al. | ............. | 709/214 |
| 6,598,075 B1 | 7/2003 | Ogdon et al. | | |
| 7,764,700 B2 * | 7/2010 | Muirhead et al. | ............. | 370/401 |
| 2002/0091789 A1 * | 7/2002 | Katariya et al. | ............... | 709/214 |
| 2003/0223450 A1 | 12/2003 | Bender et al. | | |
| 2004/0029555 A1 | 2/2004 | Tsai et al. | | |
| 2005/0027788 A1 | 2/2005 | Koopmans et al. | | |
| 2005/0188107 A1 | 8/2005 | Piercey et al. | | |
| 2005/0210122 A1 | 9/2005 | Taylor et al. | | |
| 2006/0193295 A1 | 8/2006 | White et al. | | |
| 2007/0011271 A1 * | 1/2007 | Baker et al. | .................... | 709/217 |
| 2007/0038773 A1 | 2/2007 | White et al. | | |
| 2007/0286198 A1 * | 12/2007 | Muirhead et al. | ............. | 370/392 |
| 2008/0022005 A1 | 1/2008 | Wu et al. | | |
| 2008/0182663 A1 | 7/2008 | Cheung et al. | | |
| 2011/0222404 A1 | 9/2011 | Watson et al. | | |

FOREIGN PATENT DOCUMENTS

WO   WO 2007/039016 A1   4/2007

OTHER PUBLICATIONS

Dominik Kaspar, et al. "An Analysis of the Heterogeneity and IP Packet Reordering over Multiple Wireless Networks"; IEEE Symposium on Computers and Communications (ISCC); 2009; 6 pgs.

(Continued)

*Primary Examiner* — Kenneth R Coulter
(74) *Attorney, Agent, or Firm* — Oblon, Spivak, McClelland, Maier & Neustadt, L.L.P.

(57) ABSTRACT

A process for requesting information, the process including generating a plurality of range requests using a client having a plurality of network interfaces, the range requests each corresponding to a data range of a data resource, transmitting, from the client having the plurality of network interfaces, a plurality of range requests to a server via the plurality of network interfaces, receiving, at the client and from the server, a plurality of segments via the plurality of network interfaces such that each segment is received via a network interface which transmitted the corresponding range request, each segment including a portion of the data resource, and reassembling the data resource using the plurality of segments.

45 Claims, 22 Drawing Sheets

(56) References Cited

OTHER PUBLICATIONS

Guillaume Bichot "A Multi-link Architecture for a Global Wireless Internet Connectivity"; Broadwan Workshop; May 2005_Multilink; 17 pgs.

Dominik Kaspar, et al. "Multilink Transfer over Heterogeneous Networks"; IEEE International Conference on Network Protocols (ICNP), Poster Session; 2008; 2 pgs.

* cited by examiner

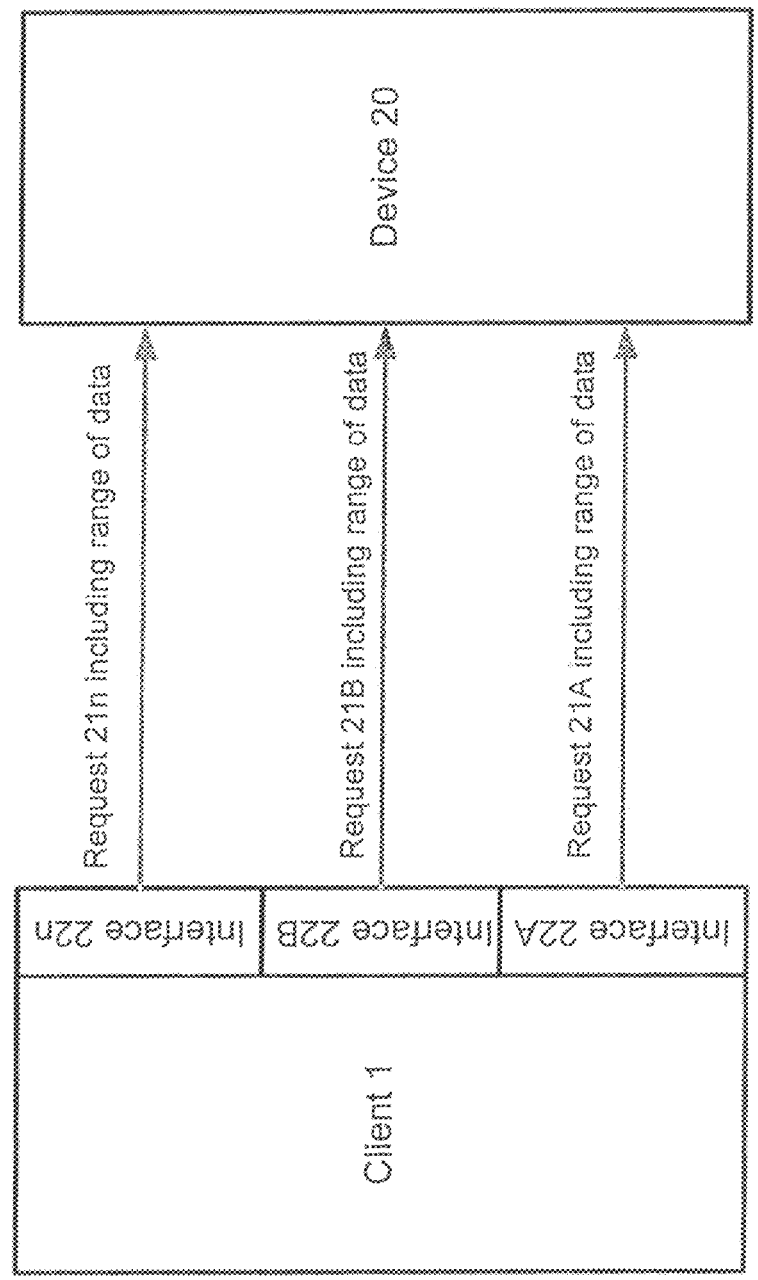

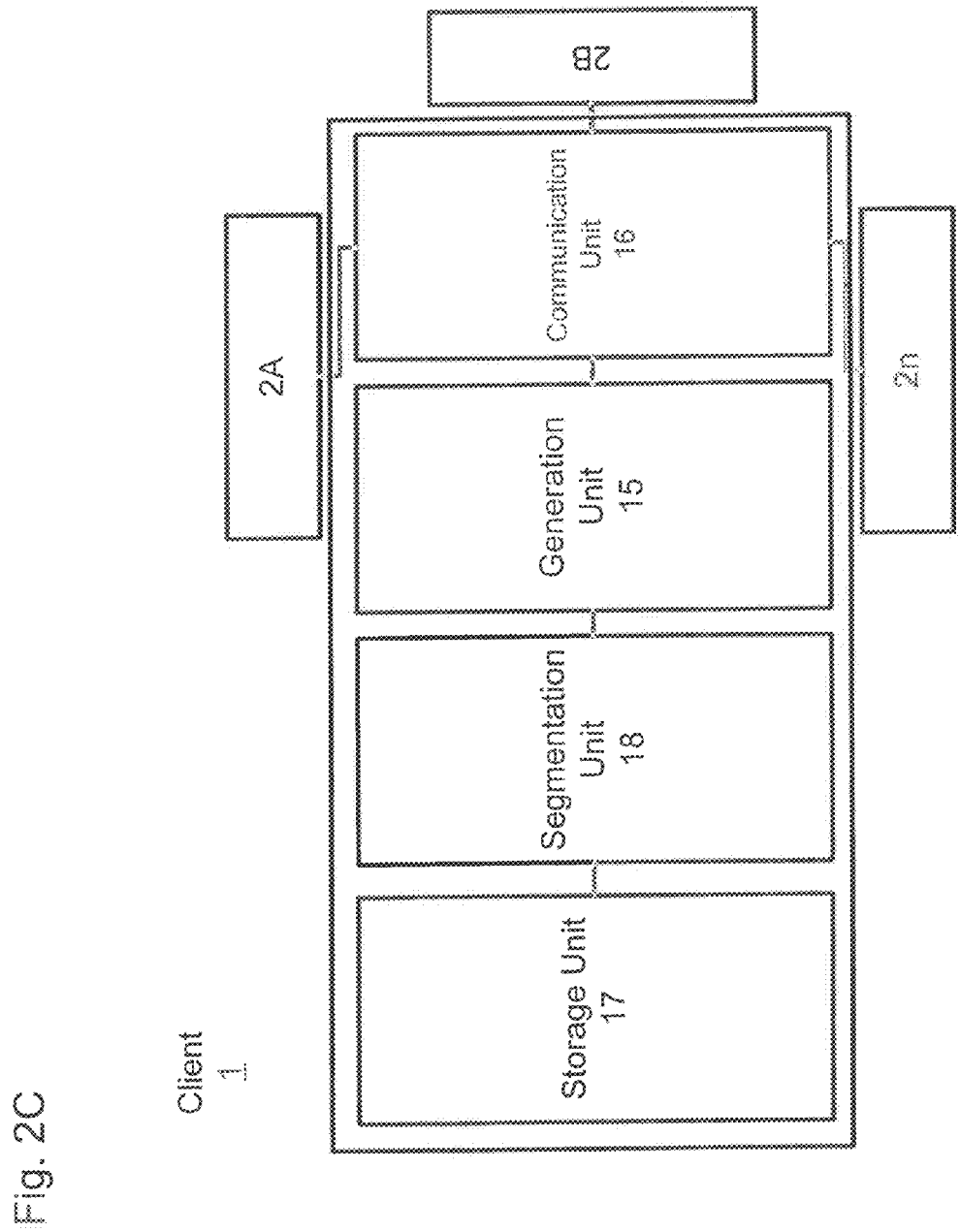

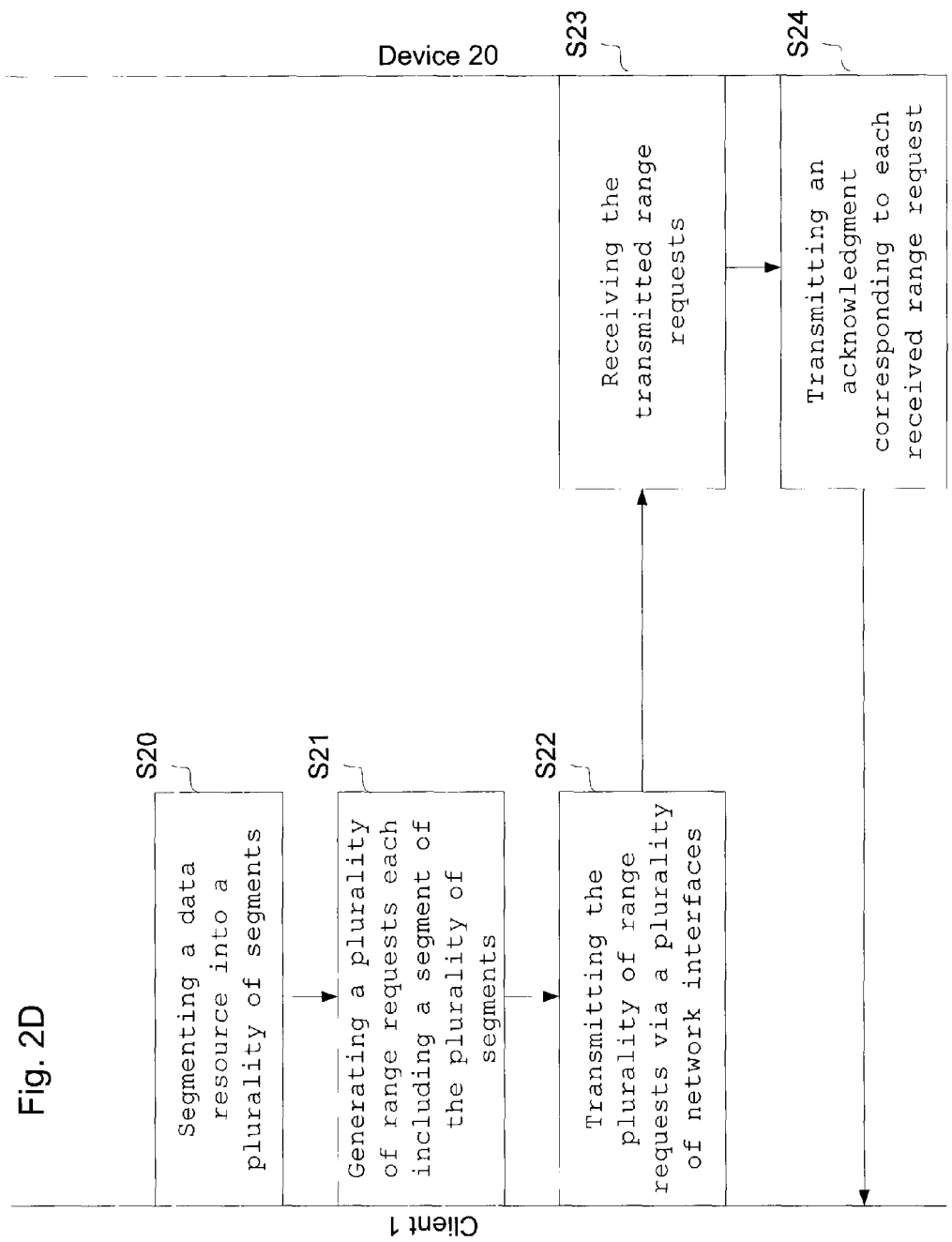

DATA SEGMENTATION, REQUEST AND TRANSFER METHOD

BACKGROUND OF THE INVENTION

1. Field of the Invention

The present invention relates to a system and method of using range requests and pipelining to segment a data resource and transfer it over multiple network interfaces.

2. Discussion of the Background

Even though user devices are often equipped with multiple network interfaces and in reach of several access networks at the same time, data to or from the Internet is normally communicated over only one of the access networks at a time. Also, even when a user device establishes multiple links to multiple access networks using its network interfaces, data to or from a particular data resource on the Internet is normally communicated over only one network link at a time. The result is that only some of the bandwidth that is theoretically available is actually used when content is delivered to a device. A multilink solution, where content is delivered over several network interfaces simultaneously would help remedy this issue. However, a major hurdle in the deployment of a multilink solution is the lack of server-side support. Although there have been suggested modifications to TCP and SCTP, standard transport protocols are unable to provide host-based bandwidth aggregation. For example, TCP is purely end-to-end and allows only one IP address (one interface) on each side. SCTP supports multiple IP addresses per endpoint, but uses them only for failover. A common approach is therefore to provide specialized libraries that transparently partition application-layer data into multiple transport streams. However, the implementation of such middleware requires software modifications to clients and servers.

SUMMARY OF THE INVENTION

Accordingly, the present invention provides, inter alia, a method of requesting information. The method includes a step of generating a plurality of range requests using a client having a plurality of network interfaces, the range requests each corresponding to a data range of a data resource. Also included in the method are the steps of transmitting, from the client having the plurality of network interfaces, a plurality of range requests to a server via the plurality of network interfaces, and receiving, at the client and from the server, a plurality of segments via the plurality of network interfaces such that each segment is received via a network interface which transmitted the corresponding range request, each segment including a portion of the data resource. Also included in the method is the step of reassembling the data resource using the plurality of segments.

In an embodiment of the invention, the method further includes a step of generating, using the client having the plurality of network interfaces, at least one additional range request, each additional range request corresponding to a data range of the data resource, a step of determining an upper time limit for each at least one additional range request, a step of transmitting, from the client having a plurality of network interfaces, the at least one additional range request to the server via at least one of the plurality of network interfaces before the determined upper time limit, a step of receiving, at the client and from the server, a plurality of additional segments via the plurality of network interfaces such that each additional segment is received via a network interface which transmitted the corresponding additional range request, each additional segment including a portion of the data resource, and a step of reassembling the data resource using at least the additional plurality of segments.

The present invention also includes a method of transferring information. The method includes a step of segmenting, using a client having a plurality of network interfaces, a data resource into a plurality of segments based on metadata of the data resource. Also included in the method are the steps of generating a plurality of range requests, the range requests each including a segment of the plurality of segments which corresponds to a data range of the data resource and transmitting, from the client having the plurality of network interfaces, the plurality of range requests to a server via the plurality of network interfaces for reassembly of the data resource using the plurality of segments at the server.

Also included in the present invention is a device for requesting information. The device includes a plurality of network interfaces and a generation unit that generates a plurality of range requests, the range requests each corresponding to a data range of a data resource. Also included in the device is a communications unit that transmits the plurality of range requests to a server via the plurality of network interfaces, the server segmenting the data resource based on the range requests into a plurality of segments, where the communications unit further receives the plurality of segments, which are transmitted by the server, via the plurality of network interfaces such that each segment is received via a network interface which transmitted the corresponding range request. Moreover, the device includes a reassembly unit that reassembles the data resource using the plurality of segments received by the communications unit.

It is to be understood that both the foregoing general description of the invention and the following detailed description are exemplary, but are not restrictive, of the invention.

BRIEF DESCRIPTION OF SEVERAL VIEWS OF THE DRAWINGS

Other objects, features and advantages of the present invention will become more apparent from the following detailed description when read in conjunction with the accompanying drawings, in which:

FIG. 2B illustrates a system according to another embodiment of the present invention including a client having multiple interfaces which communicate multiple data bearing range requests to a device;

FIG. 2C shows a block diagram illustrating an exemplary structure of the client according to another embodiment of the present invention;

FIG. 2D shows a flow diagram illustrating a method according to an embodiment of the present invention;

DETAILED DESCRIPTION OF THE INVENTIONS

Figure 1A:
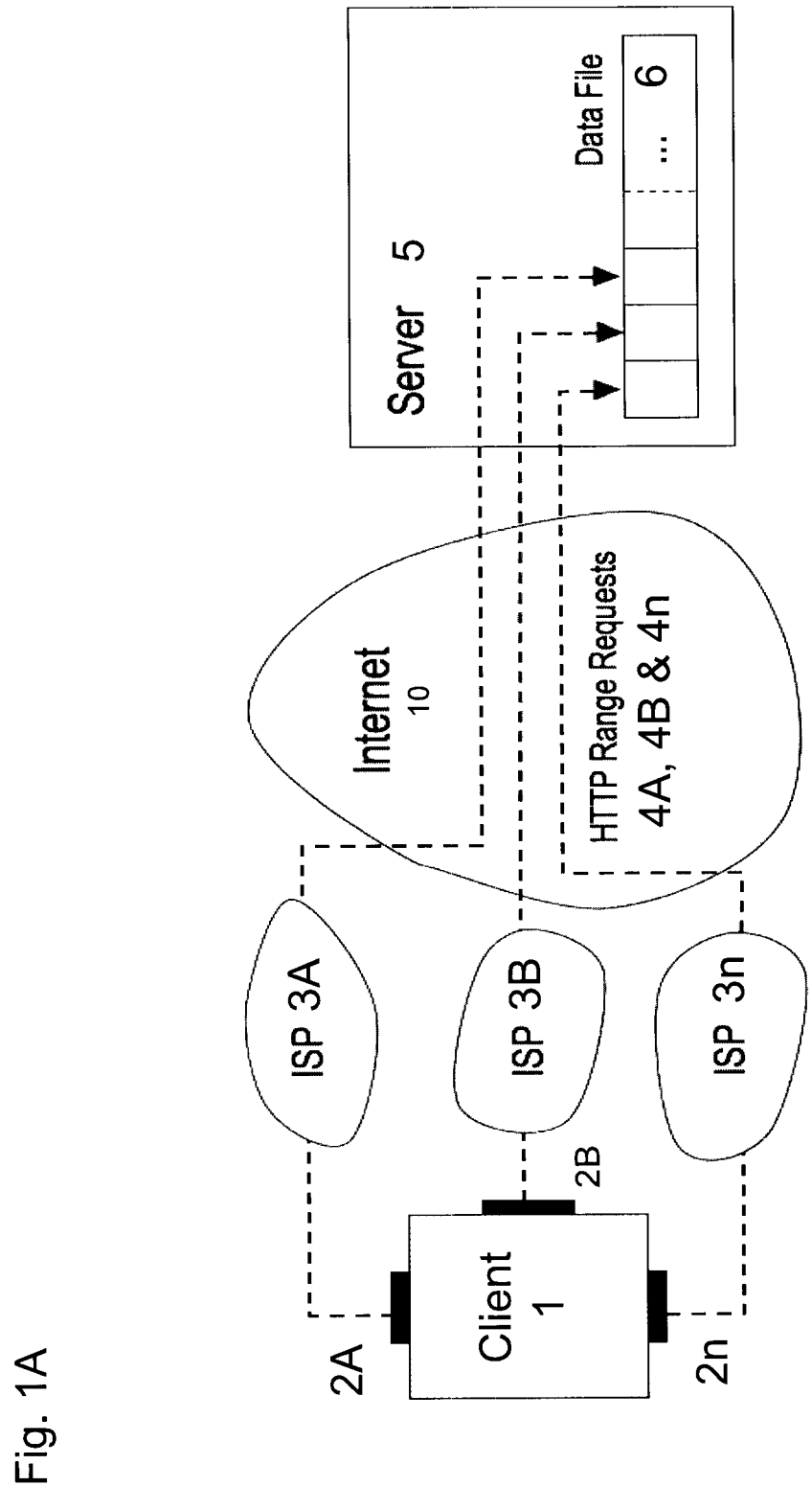
FIG. 1A illustrates a system according to an embodiment of the present invention including a client having multiple interfaces which communicate multiple range requests to a server.

Referring now to the drawings wherein like reference numbers designate identical or corresponding parts throughout the several views and more particularly to FIG. 1A thereof, there is illustrated a data transmission system including a client 1 and a server 5 which are connected via the internet 10. It should be noted that the invention is not limited such that the link between the client 1 and server 5 must be over the internet. The link between the client 1 and the server 5 can be over other types of network links such as via a body area network (BAN), personal area network (PAN), local area network (LAN), storage area network (SAN), campus area network (CAN), metropolitan area network (MAN), wide area network (WAN), wireless wide area network (WWAN), or public switched telephony network (PSTN). For example, the link can be a WWAN link compatible with a communication standard selected from the set of: Global System for Mobile communications (GSM), High Speed Packet Access (HSPA), Wideband Code Division Multiple Access (W-CDMA), Universal Mobile Telecommunications System (UMTS), Long Term Evolution (LTE), Worldwide interoperability for Microwave access (WiMax), Evolution-Data Optimized (EV-DO).

Figure 1B:
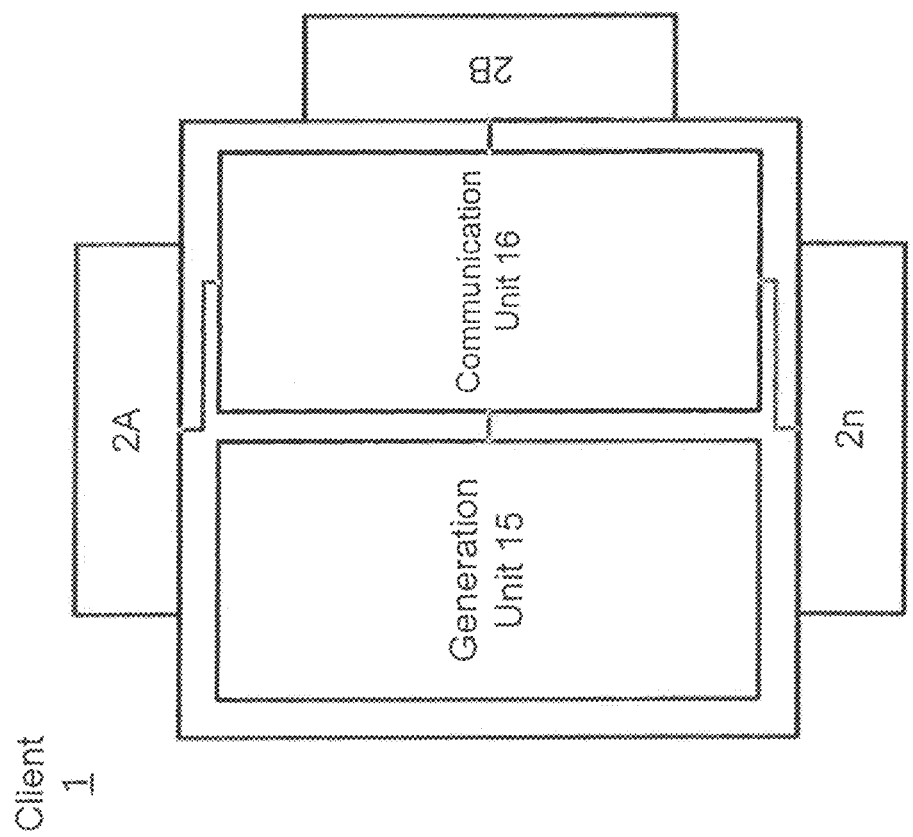
FIG. 1B shows a block diagram illustrating an exemplary structure of the client according to an embodiment of the present invention.

As is shown in FIG. 1B, the client 1 includes a plurality of interfaces 2A, 2B, ... 2n. In addition, the client 1 includes a generation unit 15 and a communication unit 16. The generation unit 15 (using a combination of hardware and software) generates a plurality of range requests 4A, 4B, ... 4n. The range requests 4A, 4B, ... 4n each correspond to a data range of a data resource 6. The communication unit 16 then transmits the plurality of range requests 4A, 4B, ... 4n to the communication unit 23 of the server 5 via the plurality of network interfaces 2A, 2B, ... 2n. In response, the server 5 segments or splits, based on the range requests 4A, 4B, ... 4n and using the segmentation unit 24 shown in FIG. 1D, the data resource 6 into a plurality of segments which are transmitted back using the communication unit 23 to the communication unit 16 of the client 1 via the network interface 2A, 2B, ... 2n which transmitted the corresponding range request 4A, 4B, ... 4n. Before segmentation, the data resource 6 may be stored in the storage unit 25 of the server 5. Additionally, before segmentation, the data resource 6 may be computed on request by the server 5 or retrieved from some other source of data.

Duplicates of the data resource 6 may also be stored on or obtained by multiple servers. Such a configuration enables the client 1 to obtain portions of the data resource 6 from different servers. In an embodiment, this can be accomplished by the client using metalinks to obtain the data resource 6. For example, if the client knows that URI-1 and URI-2 are copies on different servers, range requests could be made to both servers. Thus, for example, a first portion of the plurality of range requests 4A, 4B, ... 4n could be transmitted to a first server, a second portion of the plurality range requests 4A, 4B, ... 4n could be transmitted to a second server, and an nth portion of the plurality of range requests 4A, 4B, ... 4n could be transmitted to an nth server.

As is illustrated in FIG. 1A, interfaces 2A, 2B, ... 2n connect the client 1 to the server 5. In addition, in an embodiment, the interfaces 2A, 2B, ... 2n each connect to a respective distinct ISP 3A, 3B, ... 3n or network provider by which the range requests 4A, 4B, ... 4n and respective data provision responses are sent.

Figure 1C:
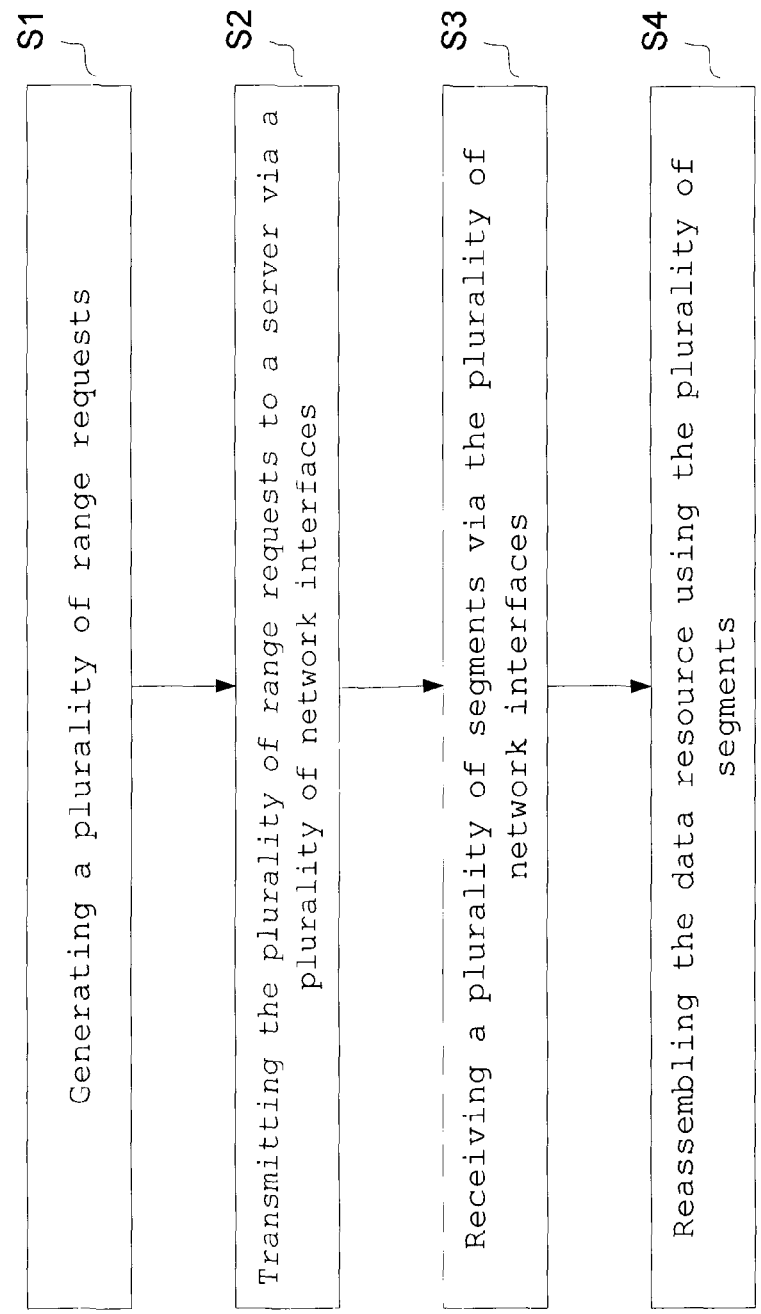
FIG. 1C shows a flow diagram illustrating a method according to an embodiment of the present invention.
Figure 1D:
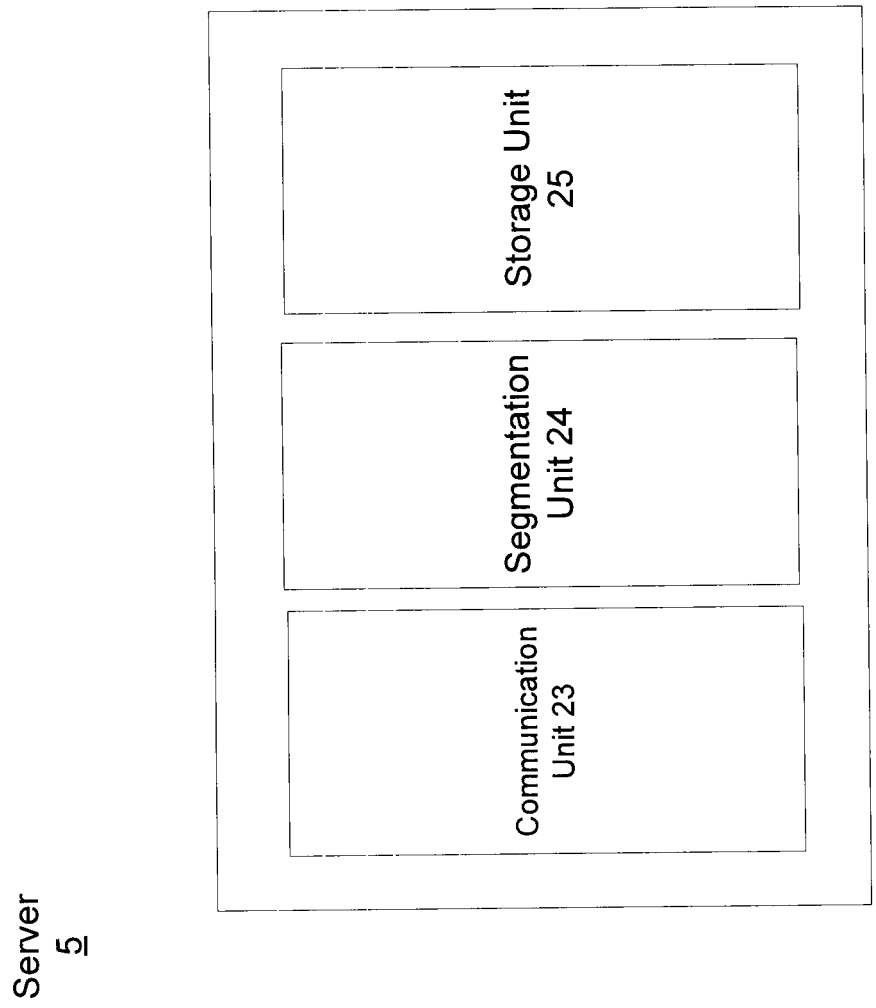
FIG. 1D shows a block diagram illustrating an exemplary structure of the server according to an embodiment of the present invention.

FIG. 1C illustrates steps performed by the client 1 when obtaining the data resource 6 from the server 5. In an embodiment of the invention, the client 1 generates (S1) a plurality of range requests 4A, 4B, ... 4n, the plurality of range requests 4A, 4B, ... 4n each corresponding to a data range of the data resource 6. The client 1 then transmits (S2) the plurality of range requests 4A, 4B, ... 4n to the server 5 via the plurality of network interfaces 2A, 2B, ... 2n. The client then receives (S3) the plurality of segments via the plurality of network interfaces 2A, 2B, ... 2n such that each segment is received via the network interface which transmitted the corresponding range request, each segment including stored therein a portion of the data resource 6. Then, the client 1 reassembles (S4) the data resource 6 which can be displayed, stored, etc. by the client 1.

Figure 1E:
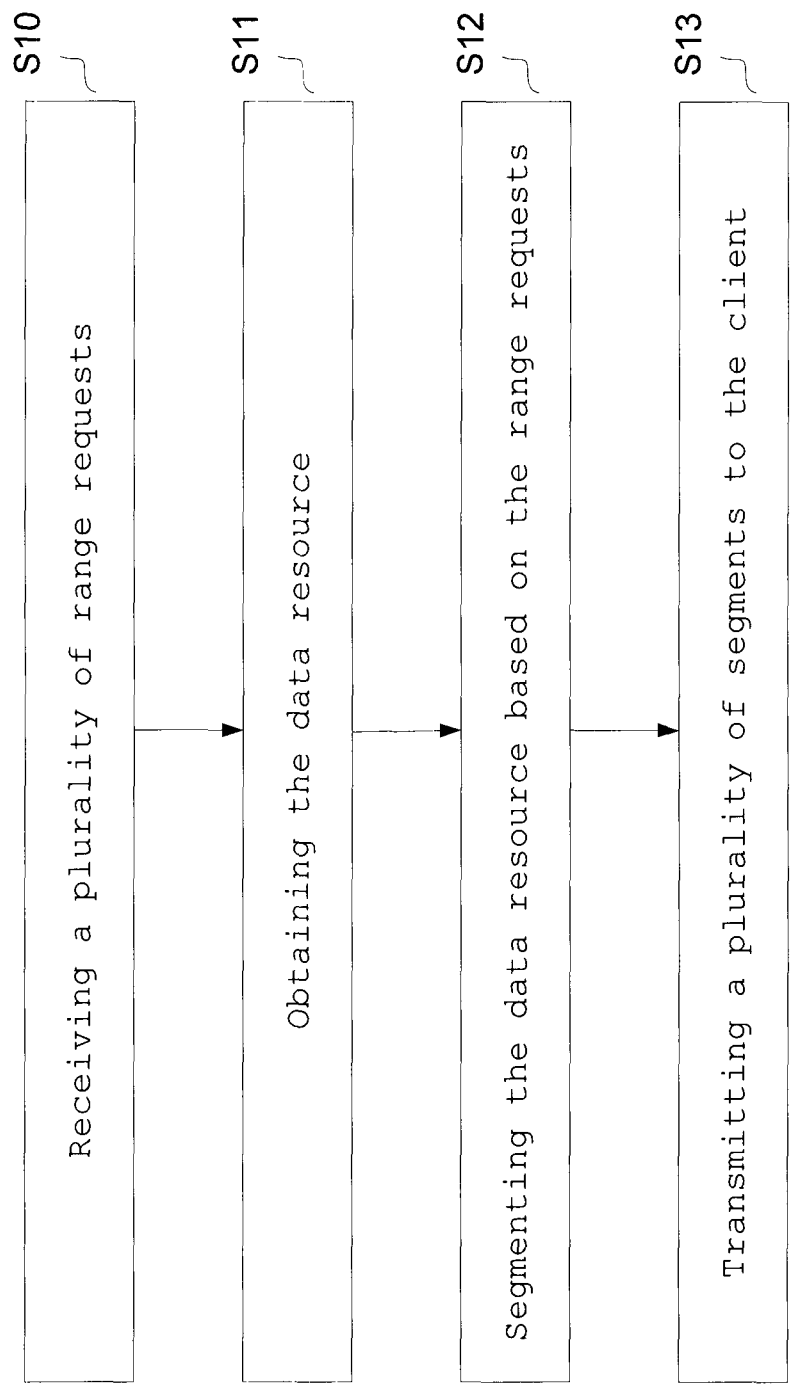
FIG. 1E shows a flow diagram illustrating a method according to an embodiment of the present invention.

FIG. 1E illustrates steps performed by the server 5 when transferring the data resource 6 to the client 1. In response to receiving (S10) a plurality of range requests 4A, 4B, ... 4n, the server 5 obtains (S11) the data resource 6. The data resource may be obtained from the storage unit 25 of the server 5, may be generated by the server 5 or may be obtained from an external source. The server 5 then segments (S12) the obtained data resource 6 into a plurality of segments based on the range requests 4A, 4B, . . . 4*n* and transmits (S13) the plurality of segments to the client 1.

Figure 2A:
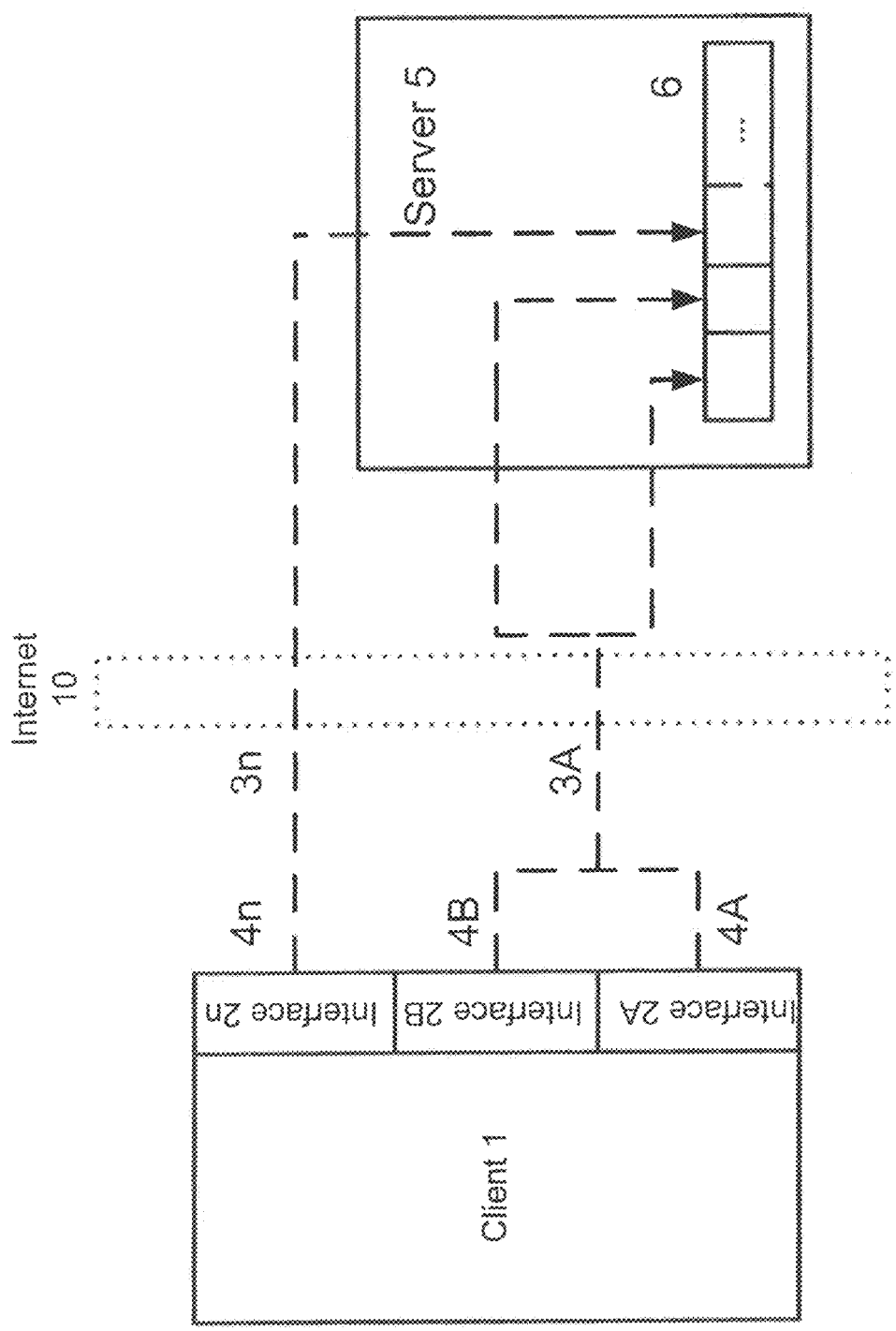
FIG. 2A illustrates a system according to another embodiment of the present invention including a client having multiple interfaces which communicate multiple range requests to a server.

FIG. 2A illustrates an alternate embodiment in which the interfaces 2A and 2B are connected to the same ISP 3A. Thus, in the embodiment shown in FIG. 2A, although the interfaces 2A and 2B send separate range requests 4A,4B and receive separate data provision responses, the network path, at least part of the way between the client 1 and the server 5, is by way of the same ISP 3A or same network provider.

One result of the use of multiple interfaces is the increase in bandwidth on a client device 1 which has access to, and is able to connect to, one or more networks over more than one interface 2A, 2B, . . . 2*n*. One example of a device which can utilize this configuration is a mobile phone (client) which has access to the Internet directly or indirectly using a WiMax link, a 3G link, a WiFi link, a cable, and/or Bluetooth, for example. Another example is a laptop computer having an Ethernet cable interface as well as WiFi interface. The various interfaces may use different protocols on the physical and link layers, but will typically use the same protocols on the network layer and the transport layer, for example TCP/IP or UDP/IP. Each network interface can establish an end-to-end communication link using for example: Transmission Control Protocol (TCP), Stream Control Transmission Protocol (SCTP), Datagram Congestion Control Protocol (DCCP), User Datagram Protocol (UDP, which is connectionless), etc. In addition, the end-to-end communication link can be one of Hypertext Transfer Protocol (HTTP), File Transfer Protocol (FTP), Session Initiation Protocol (SIP), Internet Message Access Protocol (IMAP), Session Description Protocol (SDP), etc.

In one example, the multiple range requests are created from one request referencing an entire amount of data. The ranges represent subsections of the entire amount of data. For example, the first single request is created by a browser, and the corresponding multiple requests are created by a middleware on the client that distributes the request over the multiple interfaces.

Thus, by utilizing multiple local network interfaces (being of the same or different types) to increase available bandwidth, the efficiency of concurrent utilization of multiple network interfaces is improved. In addition the efficiency of the system is further increased by using range requests to subdivide the data resource 6 such that individual data resources (e.g. a file) can be distributed over the multiple links. The data resources can be a file, data produced from a scanner, a web camera, a microphone, video, audio, etc. As is shown in FIG. 1A, the server 5 includes a data file 6 which is accessed by the client 1. In addition, as is illustrated in FIG. 1A, the client 1 sends a plurality of range requests 4A, 4B, . . . 4*n* using the plurality of interfaces 2A, 2B, . . . 2*n*.

FIG. 2B illustrates an embodiment in which, instead of simply sending a range request, a plurality of interfaces 22A, 22B, . . . 22*n* of the client 1 each send a request 21A, 21B, . . . 21*n* which includes a range of some data resource, to a device 20. Thus, the system can utilize a server 5 or some other providing resource storing or generating data to be retrieved, such as a file server, a scanner, a web camera, etc. and can also utilize a device 20 which itself is or which hosts the providing resource which is capable of receiving data such as, for example, a file (e.g. on a file server), a printer, a program or script capable of processing received data.

Moreover, in an embodiment the data resource or the providing resource is identified by a URI (uniform resource identifier), the URI being a string of characters used to identify a name or a resource. Both the data resource and the providing resource can be identified by a URI (i.e. a URL or a URN) as a URI can identify a device, data or something else, depending on circumstances.

FIG. 2C illustrates the structure of the client 1 according to the embodiment of the invention described in FIG. 2B. The client 1 shown in FIG. 2C includes a plurality of interfaces 2A, 2B, . . . 2*n*. When transferring a data resource to a device 20, the client 1 shown in FIG. 2C uses the segmentation unit 18 to segment the data resource which is either stored in the storage 17, generated at by the client 1, or retrieved from an external source by the client 1, into a plurality of segments based on a current status of the plurality of network interfaces 2A, 2B, . . . 2*n* and/or the size of the data resource. The client 1 also generates, using the generation unit 15, a plurality of range requests 4A, 4B, . . . 4*n* each including a segment of the plurality of segments which corresponds to a data range of the data resource. The segmentation may be performed before any portion of the data resource is transferred or may be performed while transfer of the data resource is in progress based on measured results of previously transmitted segments (measured bandwidth, round trip delay, etc.). The client 1 then uses the communication unit 16 to transmit the plurality of range requests 4A, 4B, . . . 4*n* including data resource segments to the device 20 via the plurality of network interfaces 2A, 2B, . . . 2*n*. The client 1 may also transmit the plurality of range requests 4A, 4B, . . . 4*n* including data resource segments to a server 5.

FIG. 2D illustrates steps performed by the client 1 and the server 5 when transferring the data resource 6 from the client 1 to the device 20. In an embodiment of the invention, the client 1 segments (S20) a data resource into a plurality of segments. The client then generates (S21) a plurality of range requests 4A, 4B, . . . 4*n* each including a segment of the plurality of segments which corresponds to a data range of the data resource 6. The plurality of range requests are then transmitted (S22) from the client 1 to the device 20 which receives the transmitted range requests (S23). Optionally, the device 20 then transmits (S24) an acknowledgment for each received range request to the client 1.

Figure 3:
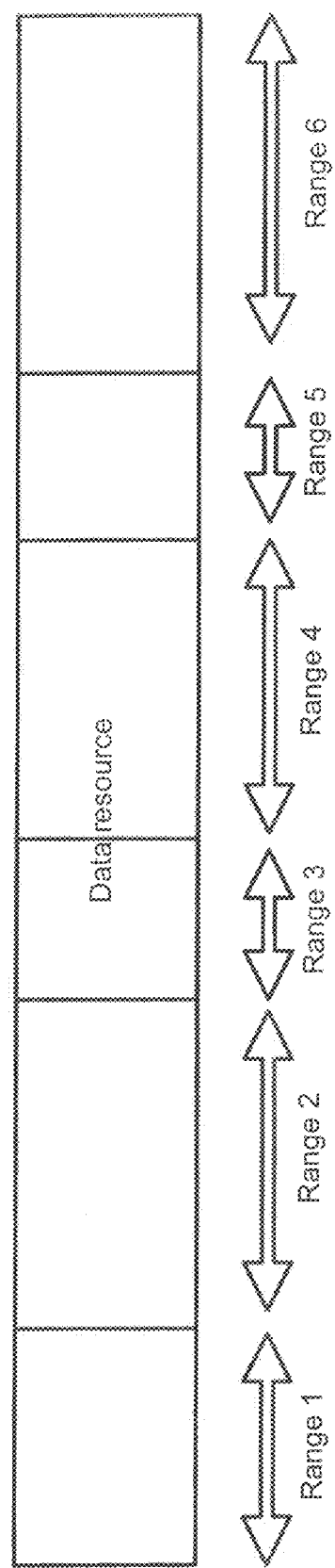
FIG. 3 illustrates a data resource according to an embodiment of the present invention that has multiple sections each corresponding to a range of the data resource.

FIG. 3 illustrates an example of a data resource (data file 6, for example) which is accessed by a plurality of range requests. Each range request corresponds to a portion of the data resource. Thus, when retrieving data, from a providing resource (server 5, Peer-to-peer device, element on a device, etc.), the range of data is a subset of data retrievable from the providing resource in response to requests, and an identification of a range includes at least a beginning (and optionally an end or an extent) of that range. The data represented by the range is expected to be received by the client device in response to the request and over the same network interface which transmitted the request.

When transmitting data, such as to the device 20, for example, the range of data is a subset of data stored, retrieved from an external device or created in the providing resource, an identification of a range includes at least a beginning (and optionally an end or an extent) of that range, and the data represented by the range is included as payload in the request. An expected response to the request is a received confirmation that the data was received and is handled according to the request.

For example, the beginning of the range (and optionally the end of the range) can be defined as a first byte position in a byte range, a time stamp, a page number, etc. In addition, the extent of the range can be defined as a number of bytes in a byte range, a duration of time (video, audio), a number of pages (document), a number of blocks (image), a number of frames (video), etc.

The invention can be implemented using existing protocols, provided that the protocol implementation at both the client and the server support ranges. For example, HTTP supports range requests. The invention is, however, not limited to existing protocols. For example, when using HTTP, the beginning and the end of the range has to be specified. The server will send all the specified bytes and cannot be interrupted (unless the underlying TCP connection is cancelled and restarted). However, the present invention allows ranges to have undefined extents ("open ends"), which is different from connections using the current http protocol.

A request, which includes the segmented data resource, may be uploaded using an HTTP PUT or POST-like request. (Note that the current version of HTTP does not support POST requests with ranges.)

Thus, when requesting data ranges, the response from the server is the data represented by the requested range and received over the same interface. When transmitting data ranges, the response from the device is a status report confirming (or not) that the transmitted data was received and processed according to the request.

In an embodiment, the size of the range for each request from each interface is dynamically determined and is based on certain factors. For example, the size of the range requests are determined such that they subdivide data payloads so that individual data resources (e.g. a file) can be distributed over several links in either predefined fixed sizes or dynamically determined by link capacity and/or delay.

In addition, the size of the range requests should be as small as possible but not so small that the available bandwidth is not optimally utilized, e.g. the size of the range should be larger than a bandwidth-delay product for the selected interface.

Small ranges provide a fine granularity which allows a "smooth", "progressive" processing of the transferred resource. The smaller the segments, the quicker the system "adapts" to variations in transfer rate. Also, the startup latency (the waiting time that is required before the transferred resource can be processed at an aggregated rate corresponding to the rate obtained from combining multiple interfaces) directly relates to the size of the ranges: the smaller the range, the smaller the required startup waiting time. Thus, one disadvantage of large ranges is that the startup waiting time increases. Also, a large range increases the chance of "unsmooth" processing if there are variances in transfer rate. For example, if one interface unexpectedly drops to 50% of the speed, it suddenly takes twice as long to "fill up a gap of missing data in the transferred resource." Such an issue is mitigated by using small ranges.

However, there can be a disadvantage to using too small of a range. For example, one disadvantage of a too small range is that the bandwidth is not optimally utilized. If less than (bandwidth*delay) bytes are requested (per interface), then the server is able to transfer an entire range before knowing what the next range should be. Therefore, the server will be idle, resulting in the bandwidth not being optimally utilized.

In an embodiment, the size of the range request for an interface is determined based, at least in part, by the bandwidth available at the interface. However, there is typically a lack of prior knowledge at the client regarding the bandwidth and round trip delay of the various links. As a result, the bandwidth and/or delay may be determined during initial transmission. For example, the bandwidth can be estimated by counting the number of transferred bytes per time unit. As capacity can change during data transfer, tracking and adapting to the changes in bandwidth/delay may be performed. For example, as a bandwidth capacity value may change over time, some averaging can be performed to optimize this value. The delay can be estimated by measuring the time between when a request is sent and an answer is received. Another way to determine the bandwidth, which can be used in certain circumstances, is to use feedback from the TCP stack, as TCP keeps estimates of the round-trip delay. An alternative approach is to probe the link with differently sized range requests which gives feedback on what the optimal range size should be based on current network conditions.

Further, in an embodiment, the size or particular range of the range requests can be determined based on obtaining metadata of the data resource. In an embodiment, the metadata of the data resource is obtained by transmitting a probing request and receiving the metadata in response. For example, transmitting an HTTP HEAD request (e.g. over the fastest network interface) using the same URI, and receiving at least one entity header field returned in response to the HTTP HEAD request. In another embodiment the metadata of the data resource is obtained by identifying the metadata from the plurality of segments received from the server. For example, identifying entity header fields received in the responses to the plurality of HTTP GET requests sent over the multiple network interfaces.

The metadata may be among other things, a content-length header field, a content-encoding header field, content-type header field, or a content-range entity header field.

For example, the metadata in a returned content-range header field may be used for determining a particular range of a range request. As a result, the client would not have to remember the value of previously requested ranges as these values would be returned in the content-range header field. The client could then generate a range request requesting a range consecutive to the immediately received range based on the metadata.

In addition, in an embodiment, the particular interface which sends a particular range request can be selected based on certain factors. For example, the network interface can be selected such that traffic is distributed efficiently. In an embodiment, the network interface is selected based on monitoring, at least a subset of, the status of the network interfaces, the response times for previous requests, the number of sent/received bytes, etc. The selection can be made prior to or after the creation of the request i.e. first a request is created and then a selection of an interface is made taking into account the nature of the request; or first a selection of an interface is made—for example because the interface becomes idle—and then a request is made, taking into account the capabilities and/or current status of the interface when creating the request by, for example, determining range size based on bandwidth-delay product, as described above.

With regard to the current status of the interface, an interface may be in one of several states including, idle, in the process of sending a request, in the process of waiting for a response, or in the process of receiving a response. The latter three states may occur simultaneously (e.g. the interface may be sending and receiving at the same time, or sending a new request while waiting for a response to a previous request). In order to determine when a response has been completely received, the requesting client may count the incoming bytes and compare them with the size of the requested range. Each response starts with a header that indicates that a new range is arriving.

If one of the interfaces goes down, delay may occur. In order to address this problem, the client by way of the communications unit, for example, is able to detect outages by monitoring the interfaces and rebalancing the load to an interface that is still working such that the data transfer can continue from the point at which the failure occurred. Any request which is only partially responded to would have to be sent again over one of the operating interfaces.

In addition, further efficiency can be obtained by pipelining requests, which means that one or more additional requests are sent down one link without waiting until a response to the previous request(s) has been received.

Figure 4:
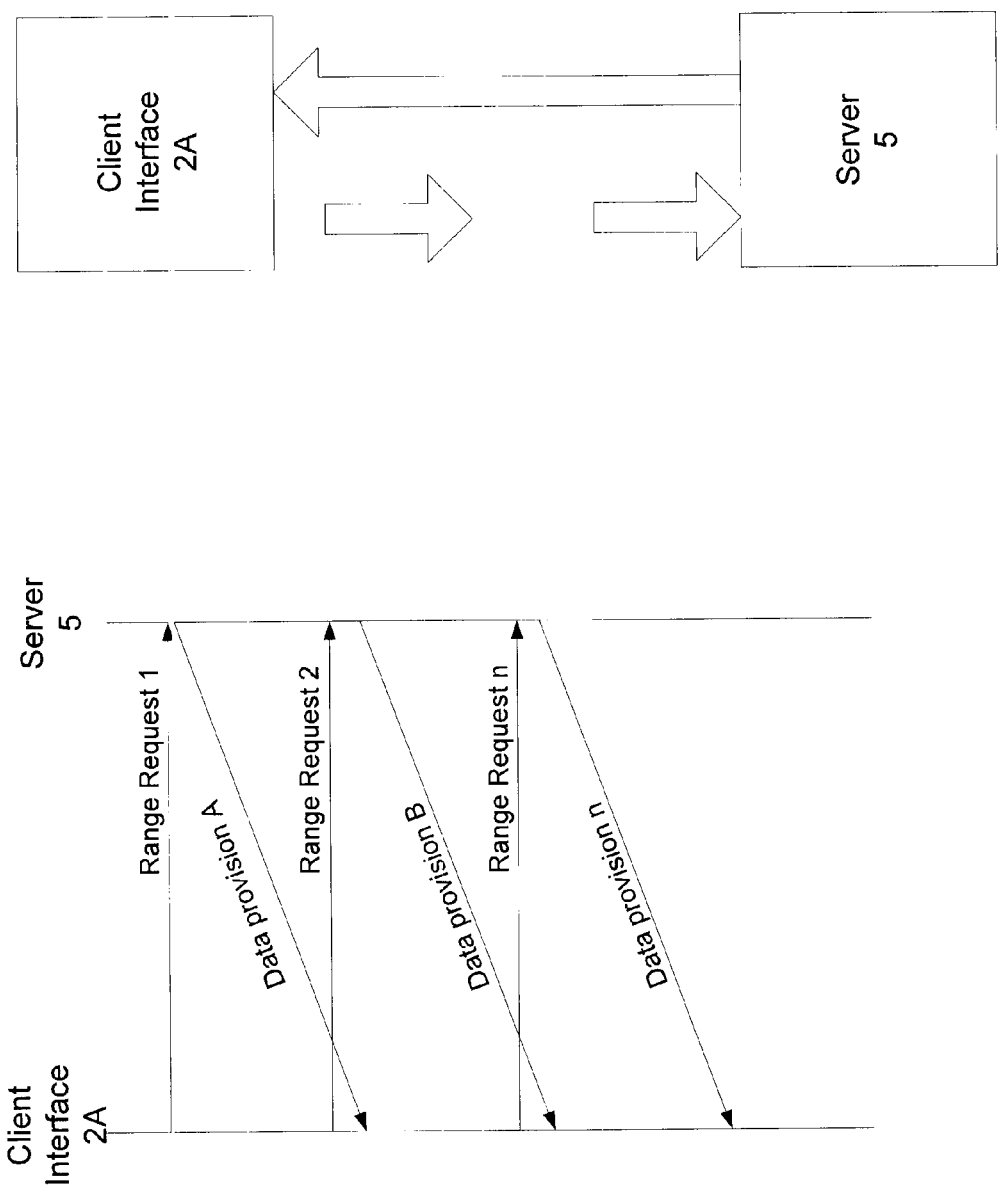
FIG. 4 illustrates a pipelining process according to an embodiment of the present invention, the pipelining distributing multiple requests from the client interface to the server.

FIG. 4 illustrates an example of the pipelining process between client interface 2A and the server 5. In this example, range request 1 is sent from the interface 2A to the server 5. In response, the server 5 begins data provision A. While the data provision A is being provided from the server 5 to the interface 2A (and is not yet complete), a second request—range request 2—is transmitted to the server 5. Once the server 5 has finished executing data provision A, the server can immediately begin data provision B, and then data provision n, in response to range request n, etc., this ensures that the server is not idle. Thus, by having a range request in the "pipeline", transmission of the data is optimized.

FIG. 4 illustrates an example in which only one request is pipelined at a time. However, it is also possible that more than one request can be pipelined. Alternatively, a request can be sent before any response to a previous request is received. In an embodiment, the number of pipelined requests may be set to 1 (one "normal" request plus one "pipelined" request). In this embodiment, the optimal number of bytes to request is computed so that the range requested "fills up the pipe" or maximizes the bandwidth potential. In this way, there is almost always data being transmitted to the interface from the server during the transmission of the data resource. Alternatively, depending on the size of the bandwidth and the time delay, more than one pipelined request in the pipeline may be useful.

Thus, by having range requests in the pipeline it is ensured that the server always is busy; always has a request waiting in the pipeline. It is not the number of requests in the pipeline, but the number of requested bytes in the pipeline that is important. Thus, the number of requests in the pipeline is also dependent on the size of the range requests. Nevertheless, if the range request is sufficiently large it is possible to include only one pipeline request per link. However, it is also possible to pipeline no request or more than one request per link.

In an embodiment, a method of pipelining requests is to pipeline a single request of X bytes, where X is the "number of bytes on flight," (i.e. the amount of data that has been sent that has not yet been received). The value X differs for each interface, because the X value is calculated as the bandwidth (e.g., bits/second)*the end-to-end delay (seconds) (bandwidth-delay product).

Figure 5:
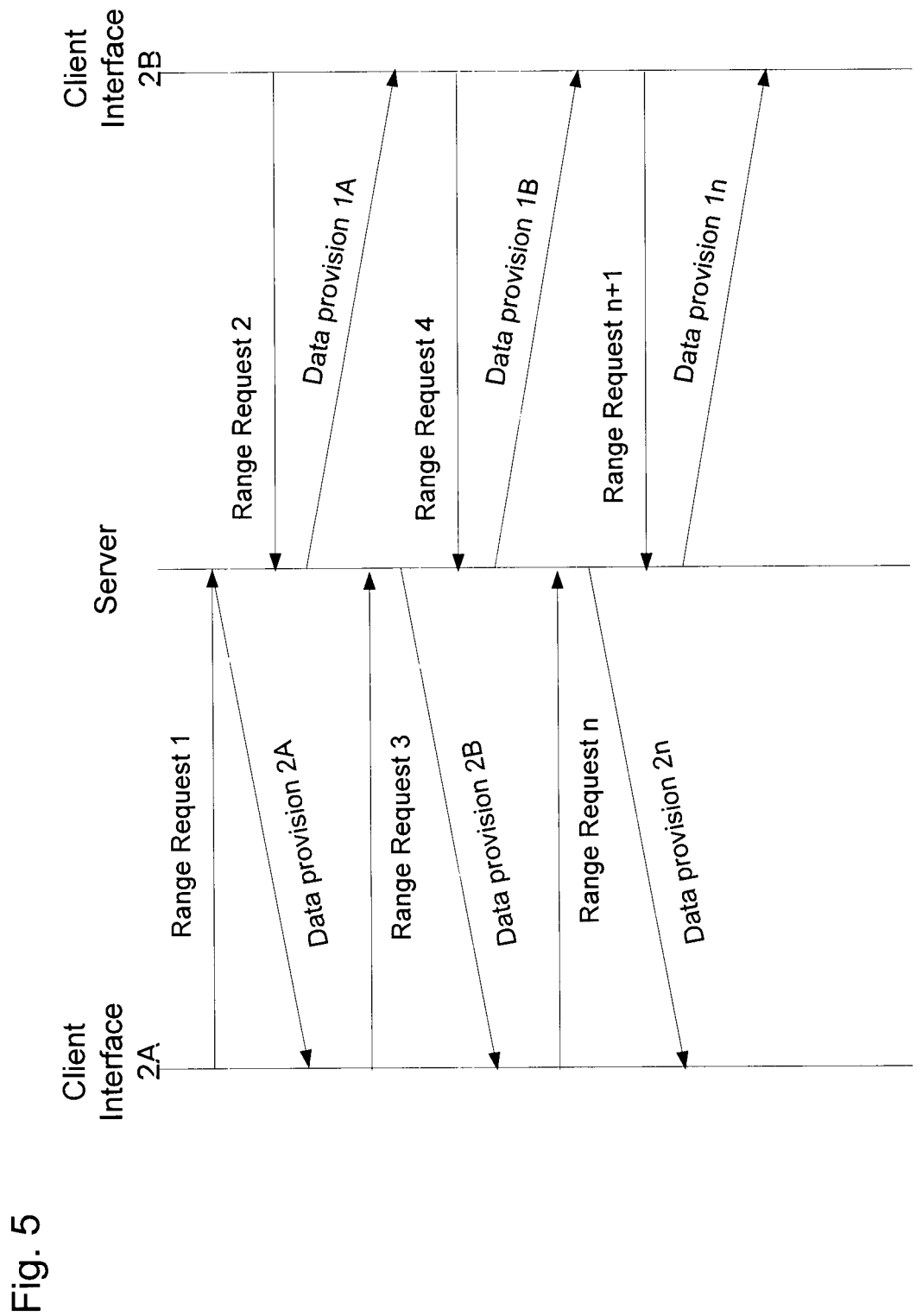
FIG. 5 illustrates a pipelining process according to another embodiment of the present invention, the pipelining distributing multiple requests from a plurality of client interfaces to the server.

FIG. 5 illustrates the process whereby a plurality of interfaces are used in the pipeline process. For example, in FIG. 5, the client interface 2A begins the process with range request 1 which is received by the server 5. The server 5 then begins data provision 2A. After the client interface 2A sends range request 1, client interface 2B sends range request 2 which is then in the pipeline. Once the server 5 has completed sending data provision 2A, the server can immediately begin sending data provision 2B. This process continues with range requests 3, 4, . . . n and data provisions 2B . . . 2n, and 1B . . . 1n. Alternatively, the client interfaces 2A, 2B, . . . 2n, etc. are able to connect to the server 5 simultaneously and each send a request and each pipeline zero or more range requests.

Figure 6:
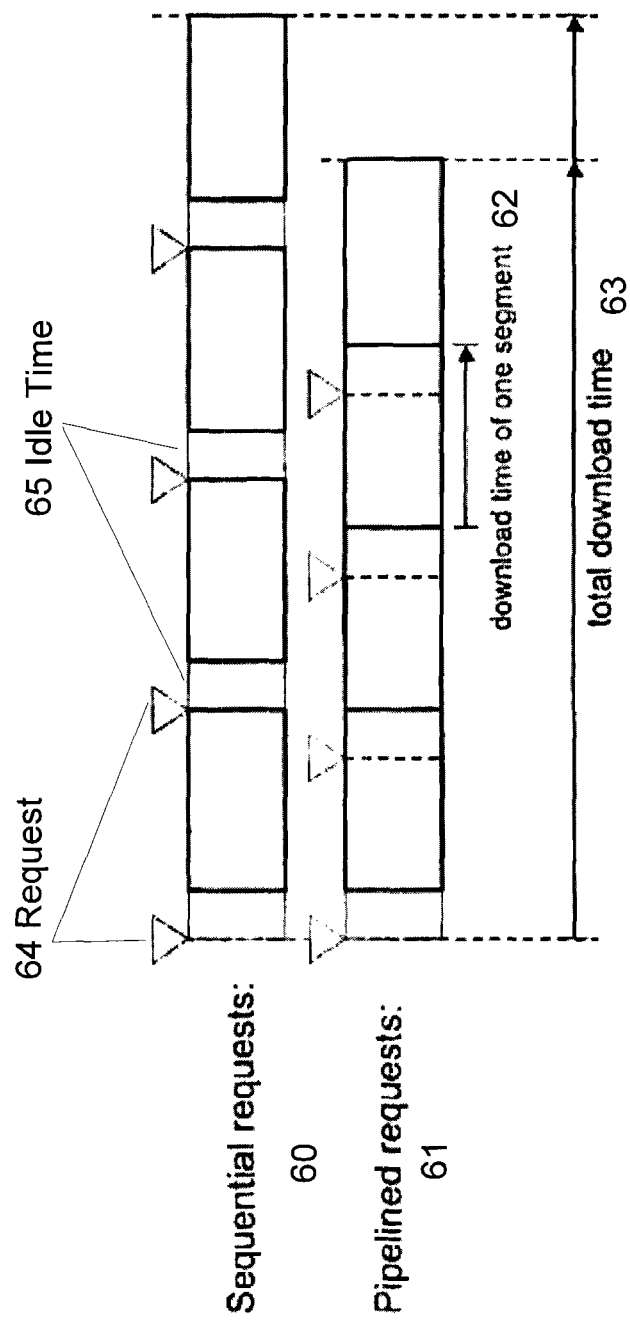
FIG. 6 shows a time diagram illustrating comparison between the time elapsed in a sequential process and a pipelined process.

One type of pipelining which can be used in the present invention is HTTP pipelining. This type of pipelining is a method that allows a client to make multiple requests without waiting for each response (pipelined requests 61), allowing a single TCP connection to be used much more efficiently, with much lower elapsed time 63. As depicted in FIG. 6, in the absence of pipelining, each range retrieval request 64 is sequentially handled by the server before the client can send the next request (sequential requests 60). Thus, for each request, an average time overhead of one round-trip time is incurred 62. For a large number of small segments (small range requests), this overhead significantly impairs the throughput of high-latency links (such as HSDPA). Thus, from a client-side perspective, HTTP pipelining eliminates the time overhead incurred by a sequential processing of requests and replies.

Figure 7:
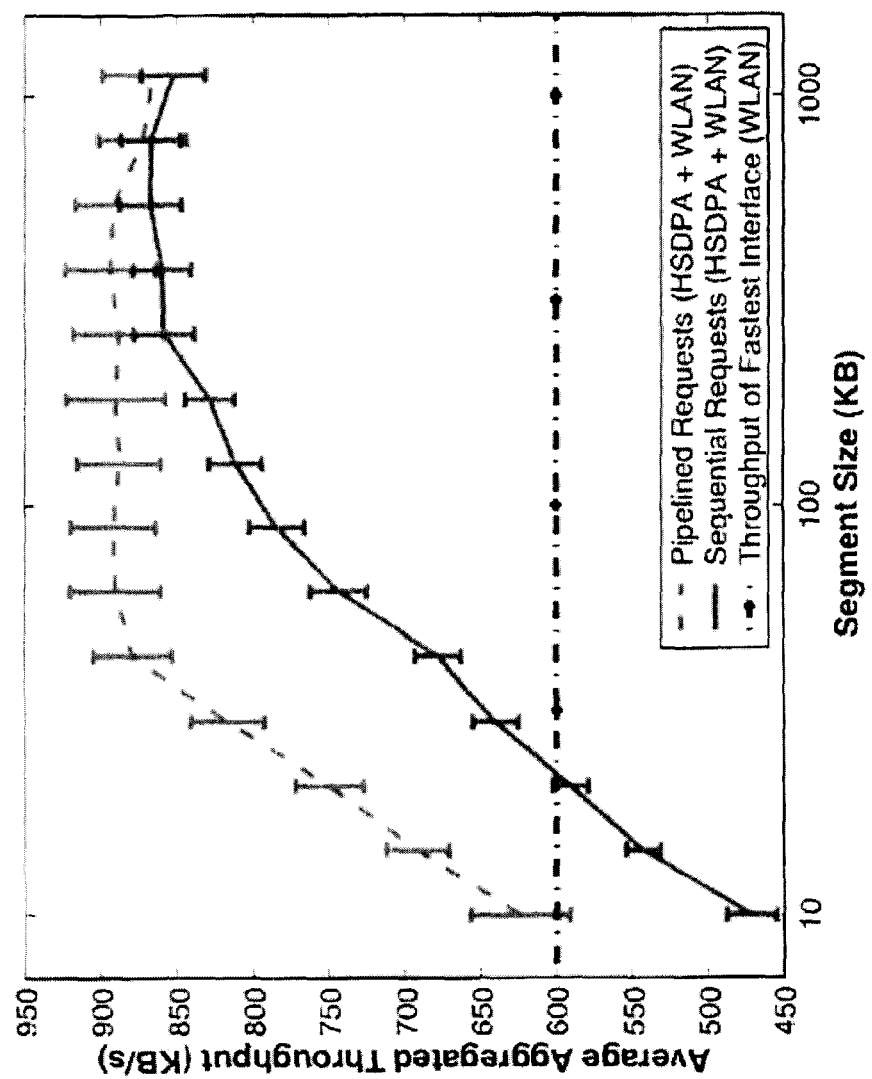
FIG. 7 illustrates experimental results obtained by downloading a file using two different interfaces.

When pipelining is not enabled, the size of each of the range requests can be increased. However, when at least one request is pipelined, a request for the next byte range is sent before the currently downloading range has completed and thus much of the time overhead can be eliminated. Moreover, as is shown in FIG. 7, when using small range sizes, using HTTP pipelining helps to increase the aggregated throughput.

Thus, using a pipelining mechanism eliminates the waiting time between successive range requests and effectively increases the aggregated throughput. The experimental results shown in FIG. 7 were obtained by simultaneously downloading a 50 MB large file over HSDPA and WLAN interfaces.

Figure 8:
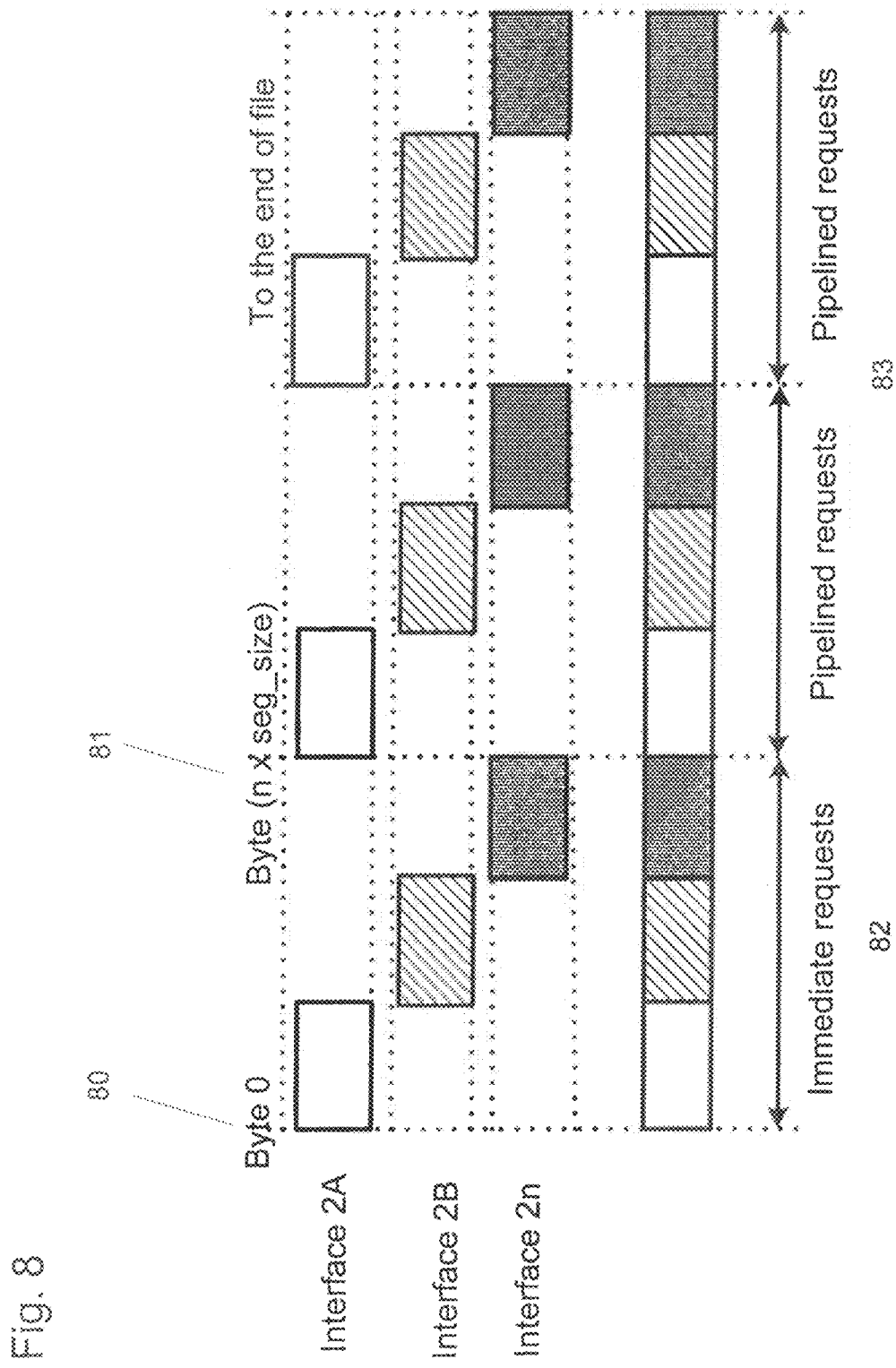
FIG. 8 illustrates a pipelining pattern when executing pipelining range requests using multiple interfaces during the start-up phase.

In addition, when pipelining is enabled, the optimal point in time for sending the next request (illustrated with small triangles 64 in FIG. 6) may be determined. Sending a range request too late will degrade the performance of pipelining, while sending the range request too early over the same link without having sent an intermediary request over a different interface increases the probability of two consecutive segments being transferred or sent by the same network interface, effectively resulting in double-size segments and one superfluous request. One way to address this issue is to use adaptive segment sizes which tailor the segment size to the available bandwidth of a network interface. Such a configuration will avoid the superfluous request as the segment size will be determined to effectively utilize the available bandwidth. Another way to address the timing issue is to schedule a predefined pipelining pattern during the startup phase. FIG. 8 illustrates an example of a pipelining pattern during the startup phase. The immediate requests 82 between "byte 0" 80 and "byte (n-segment size)" 81 are in an interleaved pattern and the pipelined requests 83 between "byte (n-segment size)" 81 and the end of the file are also in an interleaved pattern. Requesting segments over interfaces 2A, 2B . . . 2n in an interleaved pattern helps to provide a smooth playback, consistent sequential data reception, and reduces the initial response time.

During the interleaved startup phase it is ensured that consecutive byte ranges are not requested over the same interface. After the interleaved startup phase, each interface may send the range requests independently of the other interfaces (e.g. based on the receipt of data at each interface).

In addition, as is noted above, when using small range requests to improve playback smoothness, there exists a risk of choosing a range request which is too small. In this case, the server spends so little time processing a request that the client does not have enough time to pipeline the next request. This issue arises when the transmission delay $d_n$ over interface 2n is larger than the time $t_n$ it takes for the server 5 to send out a requested data segment, which is given by the segment size S and the average throughput $\Phi_n$, experienced over interface 2n: $t_n = S/\Phi_n$.

For example, in an exemplary embodiment, for a 10 KB segment over HSDPA, the server 5 requires 33 ms (i.e., 10 KB/300 KB/s) until the last byte of the segment is sent away. The problem here is that the 33 ms required to send out the data is much less than the average transmission delay $d_n$=110 ms experienced over the HSDPA link. Therefore, in this case, pipelining is not as efficient as expected, because the server 5 has sent a segment and is available to send another one, but no range request has yet been pipelined. For pipelining to work efficiently over a path with delay $d_n$, a new request should be sent from the client to the server at time $t_{req}$ after the current time $t_{now}$: $t_{req}=t_{now}+S/\Phi_i-d$.

In the example of sending 10 KB segments over HSDPA, the time $t_{req}$ is −77 ms. Thus, while the client is downloading a segment, the next segment should be requested before the current segment's download has even started. In other words, the segment size of 10 KB is too small. Thus, calculation of the minimal segment size $S_{min}$ required for fully efficient pipelining, can be calculated by setting $t_{req}=0$ and solving the equation $t_{req}=t_{now}+S/\Phi_i-d$ for the segment size S: $S_{min}=d*\Phi_i$. Thus, for example, the minimum segment size in the present example is therefore 110 ms*300 KB/s=30 KB, which is equivalent to the bandwidth-delay product of the path.

Thus, in order to alleviate the minimum segment size problem, the amount of pipelined data can be determined such that it always exceeds the path's bandwidth-delay product, which can be addressed, at least, by increasing the request range size or by pipelining multiple segments.

Figure 9:
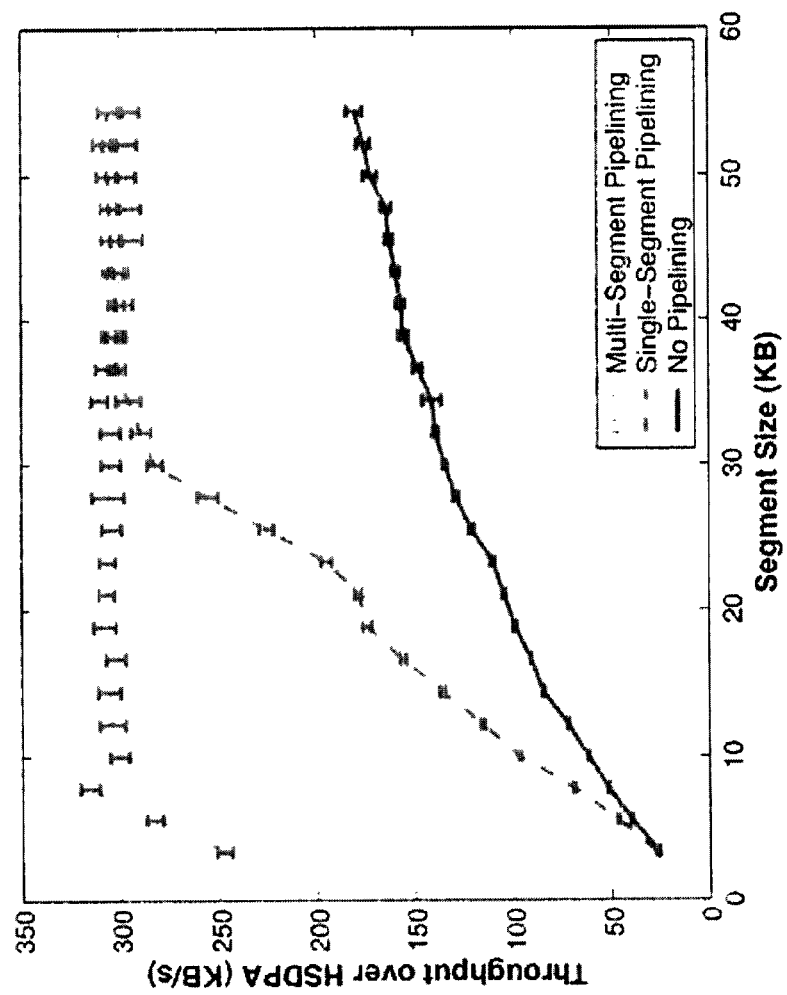
FIG. 9 shows the performance gain of multi-segment pipelining in an exemplary embodiment.

When using smaller range request sizes, the performance gain of multi-segment pipelining can be significant as is shown in an experimental example in FIG. 9 (throughput vs. segment size). While single-segment pipelining suffers from a rapid decrease in throughput for segment sizes below the bandwidth-delay product, multi-segment pipelining achieves close to optimal throughput with smaller range request sizes.

Thus, by pipelining multiple segments/requests, issues related to the minimum segment size can be addressed without the need for increased segment size and, as a result, a smooth playback can be achieved.

As is described above, distribution of load (based on determined capacity) can be performed on two different bases. First, the distribution can be performed by modifying the number of requests sent over each link. Second, the distribution can be performed by modifying the size of the range requested over each link.

However, due to the fact that the available capacity may dynamically change during transmission, the optimum distribution over the various links may not be known when requests are first sent. Therefore, it may be useful to delay sending client generated requests. Specifically, if the client were to create requests representing the entire resource and send them immediately, it would be difficult to properly take into consideration the capacities of the various links. Therefore, in order to more efficiently take into account changes in capacity, it may be useful to delay transmission such that each request is transmitted only a little bit ahead of the server becoming available. Such a delay can be accomplished a number of ways.

For example, the number of pipelined requests over each link may be limited, i.e. no additional requests are sent until after a certain number of requests have been responded to. The number of pipelined requests does not have to be changed during transfer. In addition, this embodiment may be implemented by initially, in the startup phase, 1) sending two consecutive (interleaved) requests per interface (see FIG. 8). Then based on received data from the server, 2) estimating delay and bandwidth. Once a segment corresponding to the first requested range has fully arrived, 3) generating and sending a third range request based on the estimate. The process then returns to step 2) where the delay and bandwidth estimate are again performed based on the data received from the server. A new request is again generated in step 3) using the updated delay and bandwidth estimate. This process continues looping between steps 2) and 3) until the process is complete.

Alternatively, a minimum delay (lower time limit) between requests may be enforced to prevent too many requests from being pipelined. In addition, if capacity for a link falls below a certain threshold (due to the link failing, or other significant reduction in link capacity etc.) the lower time limit for that link can be increased. Conversely, if link capacity is significantly increased (due to reduction in other traffic etc) the lower time limit for that link can be reduced.

In addition, a maximum delay (upper time limit) can also be enforced. The upper time limit ensures that the server always has access to a range request for each link. However, if capacity is reduced, the time limit can be increased (or be overridden by the lower time limit). Conversely, if capacity or server response improves the upper time limit can be reduced.

Thus, the invention can be implemented such that the distribution of the load can be performed based on the number of requests sent over each link (embodiment A) and/or based on the size of range requested over each link (embodiment B). Moreover, embodiments which regulate when requests are sent to the server such as by limiting the number of requests pipelined, or implementing a minimum time limit, can be used with either or both embodiments A and B.

Further, the maximum delay (upper time limit) can be implemented with either or both embodiments A and B as well as embodiments in which the number or requests in the pipeline is limited and in which a minimum delay is implemented.

Figure 10:
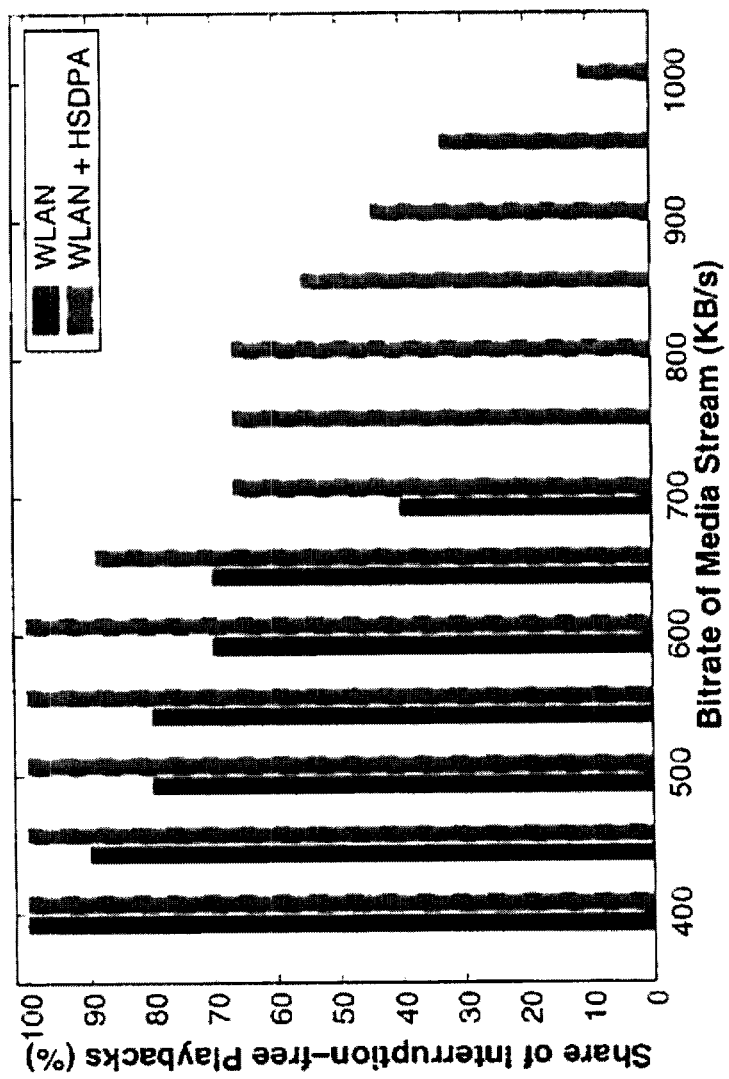
FIG. 10 illustrates an exemplary embodiment providing results from a performance comparison of using a single interface versus using multiple interfaces.

In order to illustrate the advantages of using multiple interfaces and respective range requests, FIG. 10 illustrates experimental results from a direct performance comparison of a single WLAN interface versus using an additional HSDPA interface. In this example, a 50 MB large video file is downloaded over multiple interfaces and, after a short startup delay of 3 seconds, played out at constant bitrate. Rather than analyzing complex video metrics that depend on the type of content and codes used, the present example compares pure success vs. any type of failure. Each occurrence of the constant-bitrate file reader seeking ahead of the received data is counted as a failure. A success is only recorded when the entire file was received and played back without any need for data re-buffering. As is shown in FIG. 10, the simultaneous use of multiple interfaces increases the probability of an interruption-free playback at a given bit-rate. Another way to interpret these results is that the unreliable WLAN link, which performs poorly at any bitrates above 600 KB can be made 100% reliable by adding an additional HSDPA link.

As is noted above, the range requests sent from the client interfaces 2A, 2B . . . 2n to the server 5 each include a data range identified as part of or retrievable from the resource. However, when the resource data provided by the server 5 is time dependent like video data or VoIP data, delay may become an issue.

One way to transport time-dependent data is by using progressive downloading. Progressive downloading describes the method of sequentially transferring a media file from a server, allowing data playback on the client while the download is still in progress. A particular property of progressive downloading is the use of client-side buffering for achieving smooth playback during periods of congestion. If the buffer is emptied too fast, the playback pauses until sufficient data is available again. A startup latency for filling the buffer prior to playback is therefore required to reduce the chance of an interrupted video experience. The tolerable startup latency is subjective and dependent on the media content, but may be as small as a few seconds.

Progressive downloading can be utilized over multiple network interfaces such as those described in the present invention. Moreover, such a configuration enables higher quality multimedia streams and is more robust against link variances, congestion and failures.

However, when using a progressive downloading type system, even though segments are requested sequentially over the available interfaces, data received at the client may not be linear with respect to the playback order. In particular, data that is received over one interface may be blocked by gaps because the client is still waiting for data with an earlier playback and requested over a different interface. In order to avoid data Loss, data that is received and available, but not ready for playback, can be buffered by the client.

Figure 11:
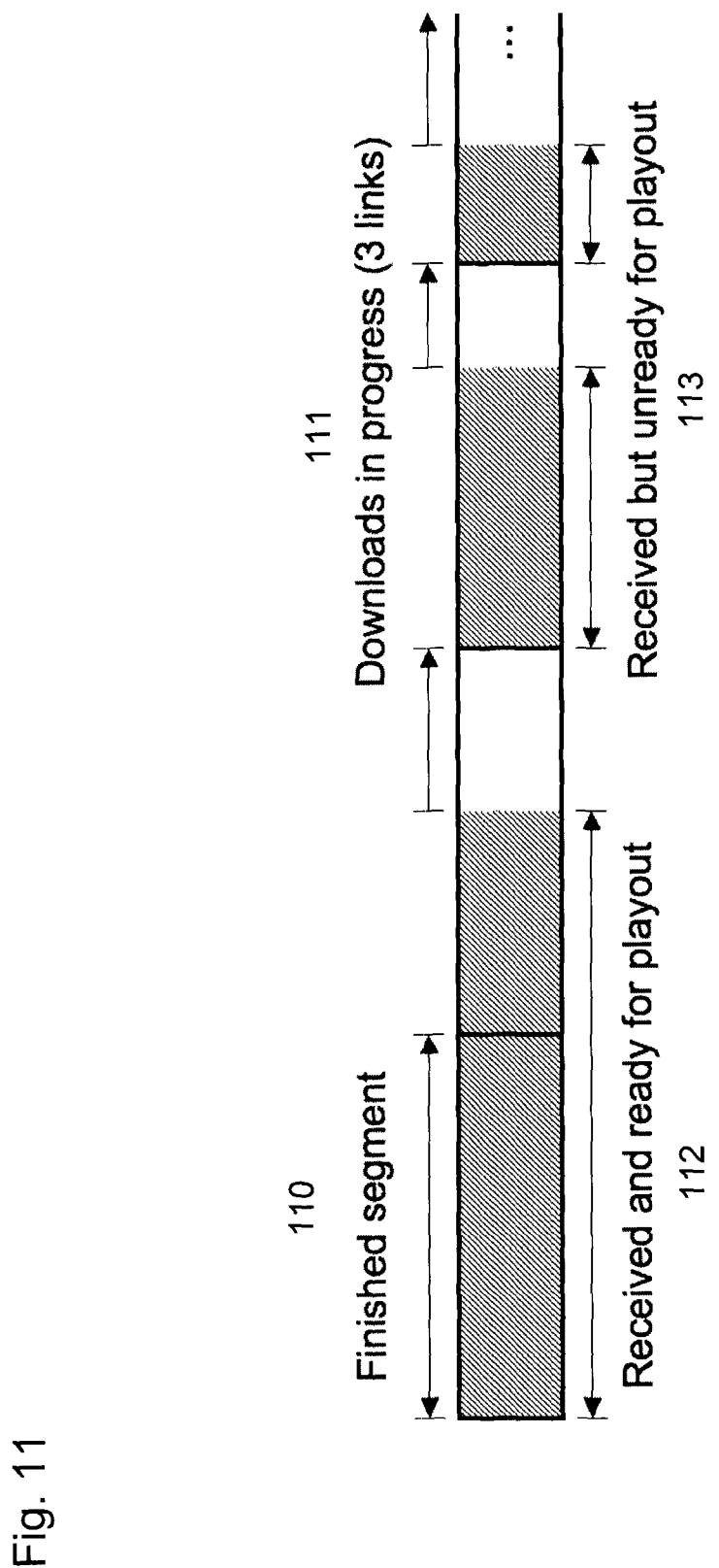
FIG. 11 illustrates the received byte ranges during a progressing download according to an exemplary embodiment of the present invention.

In an embodiment, buffered data is made available for playback after a startup latency. This enables a playback bitrate substantially equivalent to the total aggregated throughput. FIG. 11 illustrates an example snapshot of the received byte ranges during a progressing download. The shaded areas represent currently received data. FIG. 11 includes a finished segment 110 and several unfinished segments 111. The unfinished segment which is immediately after the finished segment 110 forms the data ready for playback 112. However, data that is received but not ready for playback 113 may also exist in such a system. Thus, data that follows a gap is unready for playback and is therefore buffered.

In an embodiment, the amount of data which is buffered can be determined based on the desired playback bitrate. The desired playback bitrate can be determined dynamically during the data transfer. During a live data transfer, network conditions may vary. Thus, optimal numbers may be calculated up to the current time. The "desired" playback bitrate may be equal to the current average aggregated throughput. For example, when a 6 Mbit/s download throughput is currently being achieved, the corresponding playback "quality" may be 6 Mbit/s. Moreover, the playback bitrate can dynamically adapt to the current throughput conditions (for example, by switching between resources of different quality levels or by utilizing a scalable video codec).

In an embodiment, elements such as start-up latency and buffer size can also be determined from historical data. For example, once a file download with a given segment size has completed, the average aggregated throughput can be determined using the client and/or the server by dividing the total file size by the transfer duration. The average aggregated throughput can be determined by either or both the client and the server as both have used approximately the same time to receive/send the same amount of data.

Taking into account a desired playback bitrate, the optimal startup latency and the required buffer size can be determined based on the history of received bytes.

The number of bytes that are ready for playback can be determined by the client at any given point in time (bytes_ready). Knowing the exact received byte ranges, the amount of data that must be buffered can also be determined by the client (bytes_unready).

In order to determine the minimum required startup latency, how many bytes are needed (bytes_needed) for achieving an uninterrupted and sustainable playback at the desired bitrate is calculated for every time t: bytes_needed(t) =bitrate*t−bytes_ready(t).

Figure 12:
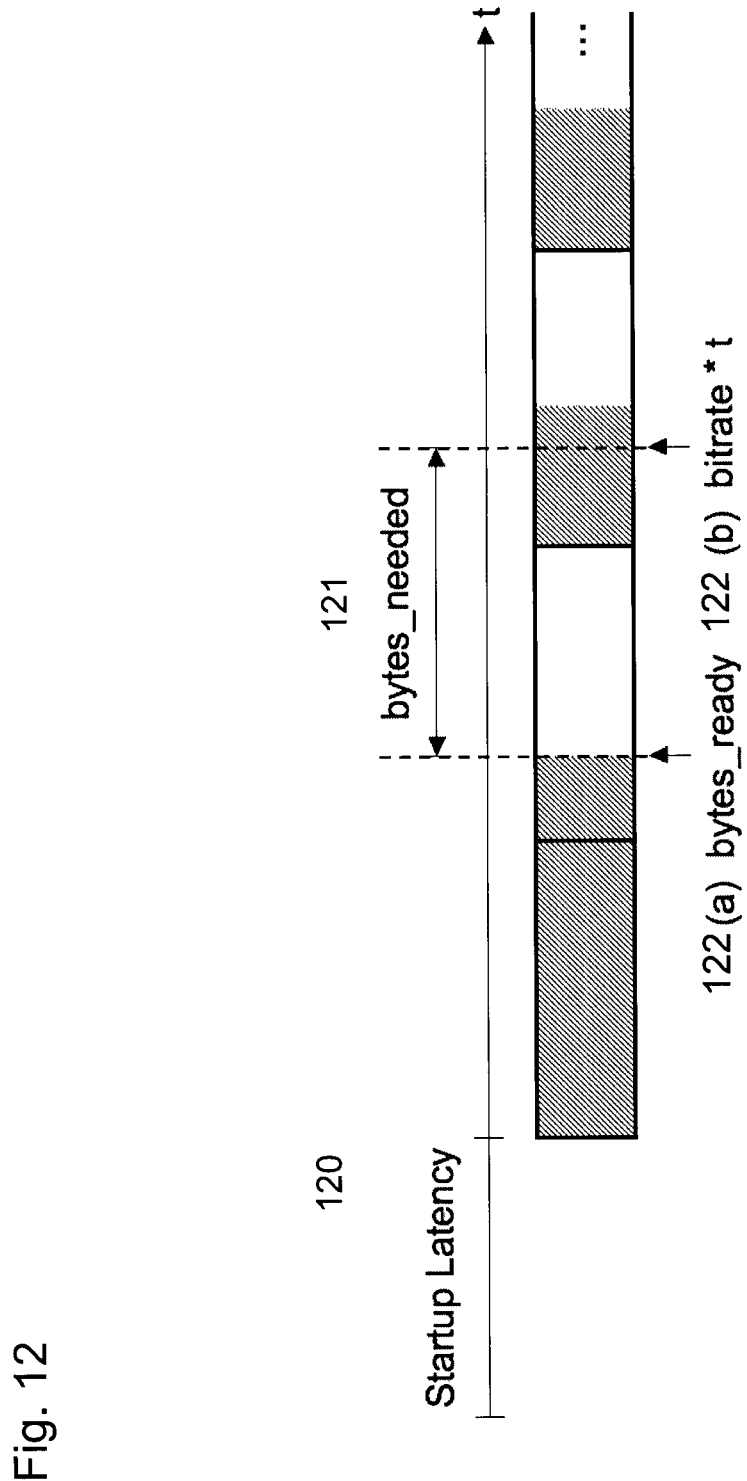
FIG. 12 illustrates an example of a startup latency during which data is downloaded but not yet played back at the desired playback bitrate according to an embodiment of the present invention.

As depicted in FIG. 12, the required startup latency 120 corresponds to the maximum number of bytes needed 121 to satisfy the desired playback bitrate. It can be calculated as follows:

$$\text{startup\_latency} = \frac{\max_t (\text{bytes\_needed}(t))}{\text{bitrate}}.$$

Thus, in FIG. 12, the required startup latency 120 is illustrated as a race between 122(a) the number of bytes ready for playback and 122(b) the desired constant-bitrate playback. The startup latency 120 thus compensates for the maximum difference between the two pointers 122(a) and 122(b).

The required buffer size can generally be understood as the maximum capacity needed to store data that was received during the startup waiting time. However, in a scenario of the client receiving file segments over multiple links, the buffer size is additionally influenced by received data that is not in correct playback order. In other words, the buffer occupancy at a given point in time is the number of received but unready bytes plus the number of playback-ready bytes needed to guarantee smooth playback. The maximum buffer requirements buf_req can thus be calculated as: buf_req=max$_t$ (bytes_unready(t)+bytes_needed(t)).

The performance of progressive download when using a multihomed host (i.e. a client with multiple network interfaces) that is simultaneously connected to a WLAN and up to two independent HSPDA networks is considered below. The measured link characteristics between the used client and server are summarized in Table 1.

TABLE 1

| OBSERVED CHARACTERISTICS OF USED LINKS | | |
|---|---|---|
|  | WLAN | HSDPA |
| Maximum achievable throughput | 640 KB/s | 320 KB/s |
| Average experienced throughput (Φ) | 600 KB/s | 250 KB/s |
| Average RTT for header-only IP packets | 20 ms | 100 ms |
| Average RTT for full-size IP packets | 30 ms | 220 ms |

All the presented results are based on downloading a 25.2 MB large file from a geographically local web server (the path lengths from the client to the server are in the range of 7 to 9 IP hops).

One advantage of downloading a file over multiple network interfaces in parallel is the expected throughput gain compared to downloading over a single network interface. When simultaneously transferring data over n different links $l_i$ $(i \in \{1, \ldots, n\})$ with average throughput $\Phi(l_i)$, an objective is to maximize the bandwidth aggregation efficiency n, which we define as:

$$n = \frac{\Phi(l_1 + \ldots + l_n)}{\Phi(l_1) + \ldots + \Phi(l_n)}.$$

In other words, for achieving ideal bandwidth aggregation, each link should transfer data at its full capacity at all times; idle periods should be kept as rare as possible.

Figure 13:
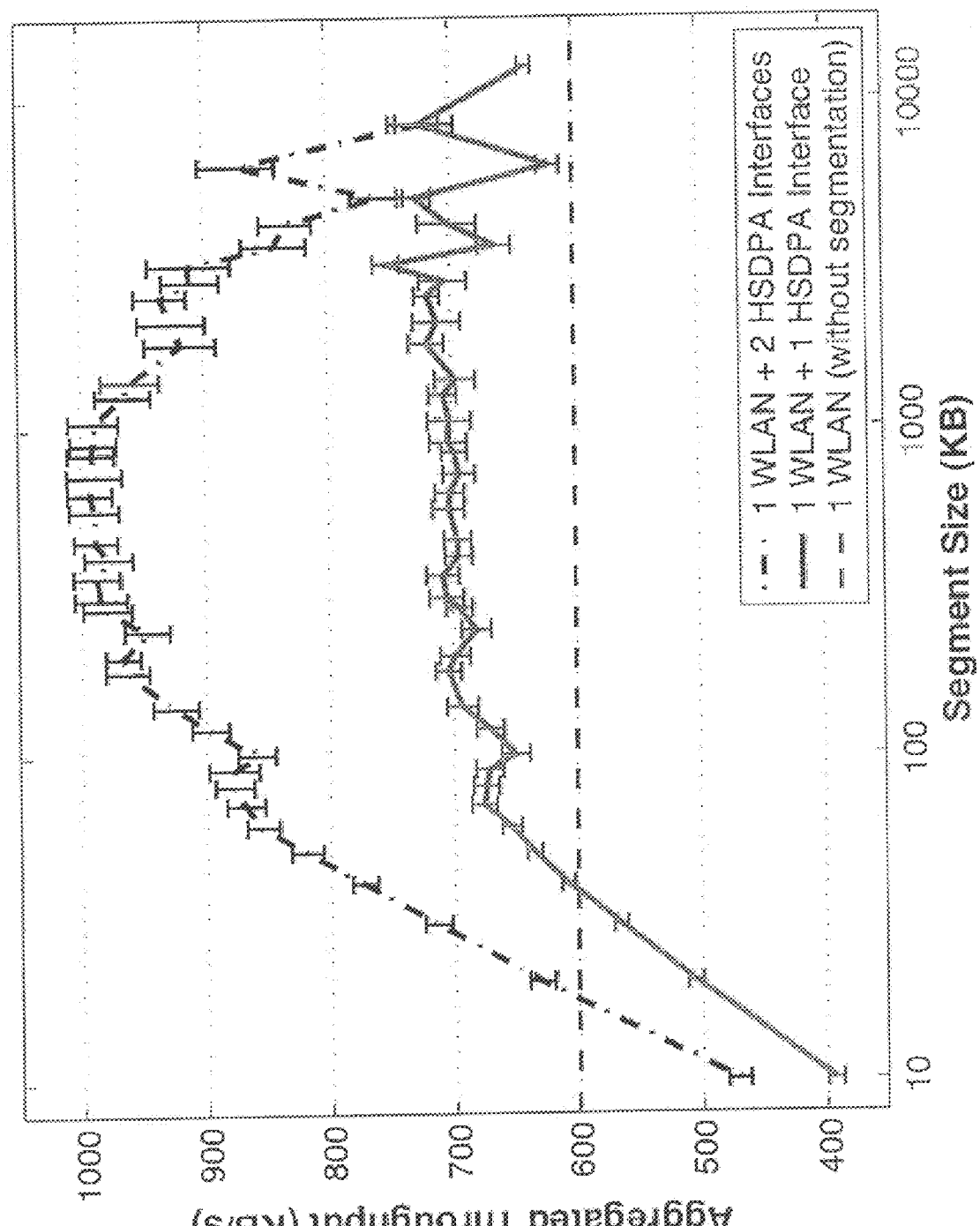
FIG. 13 illustrates a comparison of the throughput gain when using multiple interfaces and the throughput when using the fastest interface alone.

FIG. 13 illustrates a comparison of the throughput gain of combined heterogeneous networks to the traditional method of using the fastest interface alone. For optimal segment sizes (around 1000 KB in these experiments) the aggregation efficiency is n=90%.

As was noted above, the size of the range request is important. When choosing too small a range size, the utilization of the links is often interrupted due to frequent requests to the server. This causes a significant loss in bandwidth aggregation efficiency, which indicates that there exists a tradeoff between the segmentation overhead and the maximum achievable throughput. If the segmentation unit chooses too small a segment size, this increases the overhead and therefore reduces the aggregation efficiency. On the other hand, the use of too large a range size is problematic for at least two reasons. First, there is the last segment problem, which is most obvious when a file is divided in two segments. Since the networks are heterogeneous, one interface will finish first and remain idle until the entire download has finished. Second, the use of too large a segment size creates a significant increase in the required startup latency and buffer requirements.

From the results presented in FIG. 13, it is evident that an optimal segment size must exist that maximizes the aggregated throughput. The optimal segment size depends primarily on the delay heterogeneity of the used links. Therefore, the client may also dynamically adjust the segment size. Such a dynamic adjustment can be made based on link monitoring feedback (throughput and/or delay).

The required waiting time before the playback of an on-demand video is an important factor for the user-perceived quality of service. For example, when starting a full-length movie of two hours, users may be willing to wait a minute before show time, but for shorter clips, the startup should be perceived as instantaneous.

Due to link variations, the optimal startup latency may be unknown in advance. Additionally, the required startup latency depends on the desired playback bitrate, which is bounded by the aggregated throughput over the combined links. If the desired playback bitrate is well below the aggregated throughput, then the startup latency can be reduced. However, in the present invention, the multiple links enable a playback bitrate that approaches the average aggregated throughput.

Figure 14:
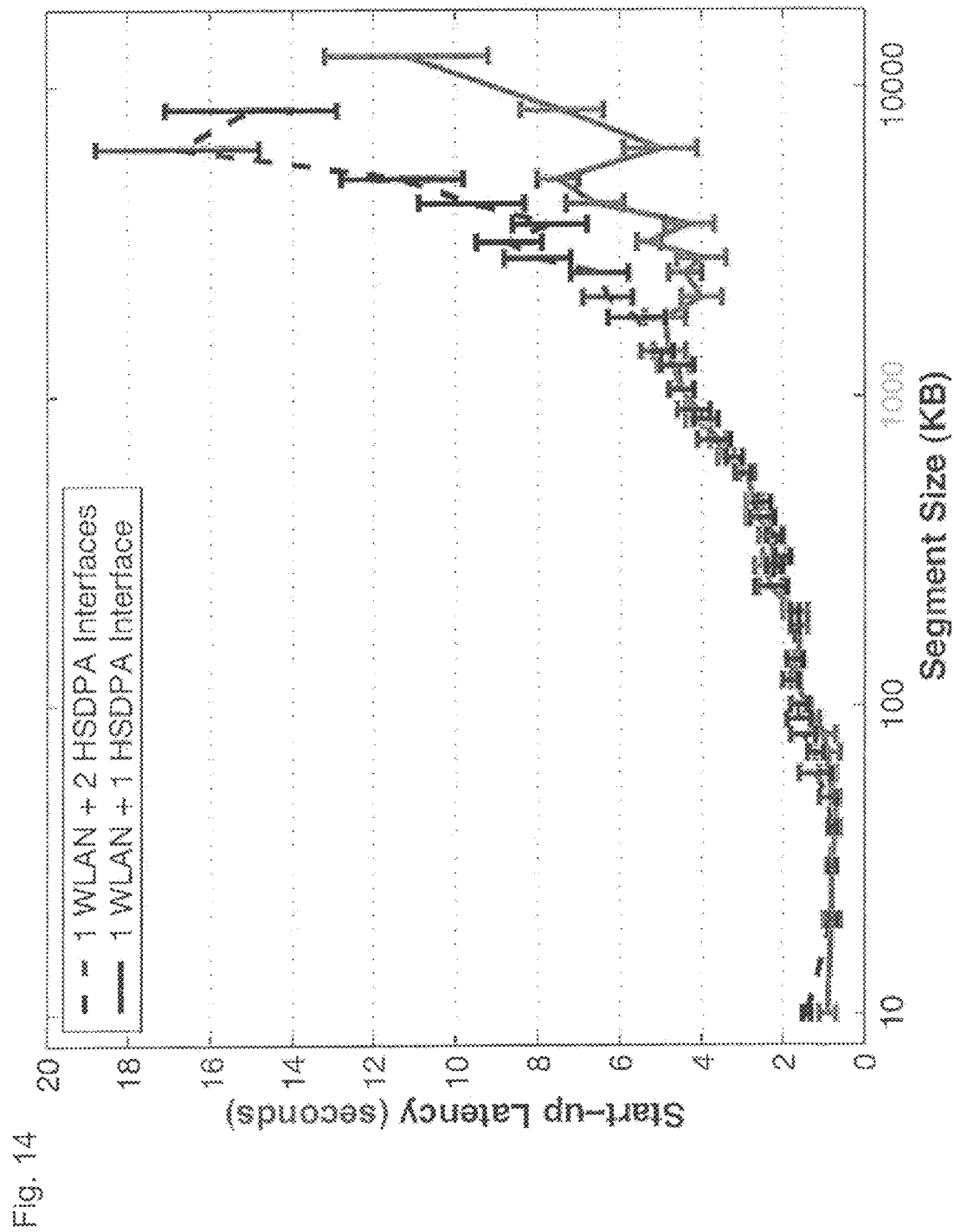
FIG. 14 illustrates a comparison of the start-up latency at various segment sizes between two exemplary embodiments of the claimed invention.

FIG. 14 illustrates two examples showing the startup latency which results in a playback bitrate equal to the average aggregated throughput. Not only for bandwidth aggregation, but also for the required startup latency, file segmentation plays an important role. When the segment size is small, it takes less time for transferring a full segment, which reduces the startup latency. From an end user's perspective, the choice of segment size equates to a balance between a shorter startup latency and a higher playback quality.

In addition to the segment size, the startup delay is also dependent on the throughput heterogeneity of the links. The larger the throughput difference between the slowest link and the others, the larger the amount of bytes needed to satisfy the desired playback rate (see bytes_needed in FIG. 12).

In order to address such issues a precise estimation of the startup latency may be used. For example the startup phase itself can be used for link monitoring purposes. When data is first received, the data is downloaded and not yet played back. The data is buffered either because the first received bytes cannot be played back, due to the bytes not making up a complete display entity, such as a video frame, or because the first bytes received, while forming a complete video frame, correspond to a frame which is too short to be shown due to quality concerns. Thus, a short startup latency is introduced to gather enough data to achieve a smoother playback.

In an alternate embodiment the startup latency at the client can be reduced by using a TCP-like slow growth in segment sizes.

In order to store received data that is not ready for playback, buffering is needed. From an end user's perspective, the required buffer size is of little relevance. However, for the development of multilink on-demand streaming solutions on devices with scarce memory, the maximum required buffer capacity represents an important design factor.

The maximum expected buffer size increases with the range size determined by the client and is in close correlation with the required startup latency. The only major difference between the two metrics is their dependence on the number of used interfaces. As the startup latency is dominated by the slowest link used, the aggregation of additional faster interfaces will not have any significant impact on the startup latency. On the ether hand, the buffer capacity increases with the number of used network interfaces, because each interface causes additional out-of-order data to be received and buffered.

When using a reception device with memory constraints, it is possible to determine an optimal balance of the playback bitrate and the startup latency based on the limited available buffer capacity.

Figure 15:
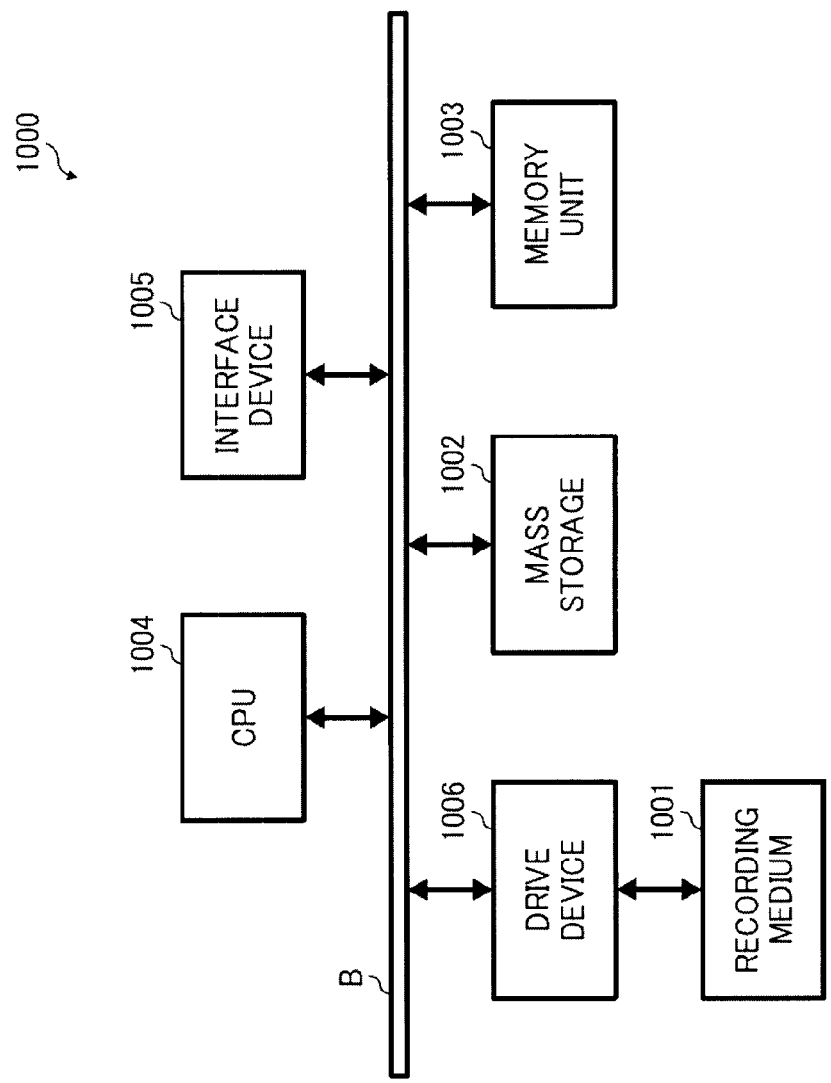
FIG. 15 shows a block diagram illustrating a hardware configuration of a device of the present invention.

FIG. 15 illustrates the hardware structure of, for example, the client 1 according to an embodiment of the invention. The client 1 includes a bus B or other communication mechanism for communicating information, and a processor/CPU 1004 coupled with the bus B for processing the information. The client 1 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The client 1 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The client 1 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the client 1 using an appropriate device interface (e.g., small computer system interface (SCSI), integrated device electronics (IDE), enhanced-IDE (E-IDE) also known as Parallel ATA (PATA), Serial ATA (SATA), direct memory access (DMA), or ultra-DMA).

The client 1 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The client 1 may also include a display controller coupled to the bus B to control a display, such as a cathode ray tube (CRT) or a liquid crystal display (LCD), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The client 1 performs at least a portion of the processing steps of the invention in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multi-processing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

As stated above, the client 1 includes at least one computer readable medium 1001 or memory for holding instructions programmed according to the teachings of the invention and for containing data structures, tables, records, or other data described herein. Examples of non-transitory computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the client 1, for driving a device or devices for implementing the invention, and for enabling the client 1 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The client 1 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN) card or a modem to provide a data communication link to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a link to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a link to a mobile device such as a personal digital assistant (PDA) laptop computer, or cellular telephone.

Modifications to embodiments of the invention described in the foregoing are susceptible to being implemented without departing from the scope of the invention as defined by the appended claims.

"Enhancing Video-on-Demand Playout over Multiple Heterogeneous Access Networks" by D. Kasper, K. R. Evensen, P. E. Engelstad, A. F. Hansen, P. Halvorsen, and C. Griwodz, Consumer Communications and Networking Conference (CCNC), ed. by IEEE, IEEE (ISBN:978-1-4244-5176-0) is incorporated herein by reference.

The invention claimed is:

1. A method of requesting information, comprising:
generating a plurality of range requests using a client having a plurality of network interfaces respectively connected to different network links, the range requests each corresponding to a data range of a data resource;
transmitting, from the client having the plurality of network interfaces, a plurality of range requests to a server via the plurality of network interfaces;
receiving, at the client and from the server, a plurality of segments via the plurality of network interfaces such that each segment is received via a network interface which transmitted the corresponding range request, each segment including a portion of the data resource; and
reassembling the data resource using the plurality of segments,
wherein the plurality of range requests are generated based on a current status of the plurality of network interfaces, and
wherein the current status of the plurality of network interfaces is determined based on available bandwidth and round-trip delay of each of the plurality of network interfaces.

2. The method of claim 1, further comprising:
obtaining, at the client, metadata of the data resource; and
generating at least one of the plurality of range requests based on the obtained metadata of the data resource.

3. The method of claim 1, wherein each of the plurality of network interfaces is connected to the server, at least partially, by way of a different network provider and the plurality of range requests are transmitted to the server by way of the different network provider.

4. The method of claim 1, wherein at least two of the plurality of network interfaces are connected to the server, at least partially, by way of a different network provider and the plurality of range requests are transmitted to the server by way of the different network provider.

5. The method of claim 1, wherein at least one of the plurality of range requests is generated based on metadata of the data resource obtained after the client transmits at least one of the plurality of range requests to the server.

6. The method according to claim 1, comprising:
generating, using the client having the plurality of network interfaces, at least one additional range request, each additional range request corresponding to a data range of the data resource;
determining an upper time limit for each at least one additional range request;
transmitting, from the client having a plurality of network interfaces, the at least one additional range request to the server via at least one of the plurality of network interfaces before the determined upper time limit;
receiving, at the client and from the server, a plurality of additional segments via the plurality of network interfaces such that each additional segment is received via a network interface which transmitted the corresponding additional range request, each additional segment including a portion of the data resource; and
reassembling the data resource using at least the additional plurality of segments.

7. The method of claim 6, wherein the at least one additional range request is included in the plurality of range requests.

8. The method of claim 7, wherein the transmitting the plurality of range requests further comprises determining a distribution of range requests over the plurality of network interfaces, and
wherein the generating the plurality of range requests further comprises determining a size of each of the plurality of range requests.

9. The method of claim 7, wherein the plurality of range requests includes two initial range requests which are transmitted before any additional range request is transmitted.

10. The method of claim 6, further comprising:
determining a limit on a number of additional range requests generated and/or transmitted before reception of a segment corresponding to a previous range request is complete.

11. The method of claim 6, wherein the upper time limit corresponds to a latest time by which the at least one additional range request is sent such that the at least one additional range request, transmitted via one of the plurality of network interfaces, is expected to be received by the server before the server finishes transmitting a segment corresponding a last received range request from the one of the plurality of network interfaces.

12. The method of claim 6, wherein the transmitting further comprises transmitting the at least one additional range request to the server no earlier than a determined lower time limit.

13. The method of claim 12, wherein the lower time limit and the upper time limit are updated in response to any significant variation in bandwidth or round trip delay.

14. The method of claim 6, wherein the at least one additional range request is generated based on a current status of the plurality of network interfaces.

15. The method of claim 6, further comprising:
obtaining, at the client, metadata of the data resource; and
generating the at least one additional range request based on the obtained metadata of the data resource.

16. The method of claim 6, wherein each of the plurality of network interfaces are connected to the server, at least partially, by way of a different network provider and the at least one additional range request is transmitted to the server by way of the different network provider.

17. The method of claim 6, wherein at least two of the plurality of network interfaces are connected to the server, at least partially, by way of a different network provider and the at least one additional range request is transmitted to the server by way of the different network provider.

18. The method according to claim 1, comprising:
receiving the plurality of range requests at the server;
obtaining the data resource;
segmenting the data resource based on the range requests received at the server into the plurality of segments; and
transmitting the plurality of segments to the client via the network interface which transmitted the corresponding range request.

19. The method according to claim 18, wherein the obtaining step further comprises obtaining the data resource from an external source.

20. The method according to claim 18, wherein the obtaining step further comprises generating the data resource.

21. The method according to claim 18, wherein the obtaining step further comprises reading the data resource from a storage unit of the server.

22. The method according to claim 1, further comprising:
transmitting, from the client, the plurality of range requests to a plurality of servers via the plurality of network interfaces, each of the plurality of servers having at least a portion of the data resource;
receiving, at the client and from the plurality of servers, the plurality of segments via the plurality of network interfaces.

23. The method according to claim 1, wherein the generating the plurality of range requests further includes:
adjusting segment sizes of the plurality of segments by adjusting the range requests based on a current status of the plurality of network interfaces, the current status including throughput or delay of the network interfaces.

24. A method of transferring information, comprising:
segmenting, using a client having a plurality of network interfaces respectively connected to different network links, a data resource into a plurality of segments based on metadata of the data resource;
generating a plurality of range requests, the range requests each including a segment of the plurality of segments which corresponds to a data range of the data resource; and
transmitting, from the client having the plurality of network interfaces, the plurality of range requests to a server via the plurality of network interfaces for reassembly of the data resource using the plurality of segments at the server,
wherein the plurality of range requests are generated based on a current status of the plurality of network interfaces, and
wherein the current status of the plurality of network interfaces is determined based on available bandwidth and round-trip delay of each of the plurality of network interfaces.

25. The method according to claim 24, wherein the segmenting the data resource into the plurality of segments is further based on the current status of the plurality of network interfaces.

26. A device for requesting information, comprising:
- a plurality of network interfaces respectively connected to different network links;
- a generation unit configured to generate a plurality of range requests, the range requests each corresponding to a data range of a data resource;
- a communications unit configured to transmit the plurality of range requests to a server via the plurality of network interfaces, the server segmenting the data resource based on the range requests into a plurality of segments,
- wherein the communications unit is further configured to receive the plurality of segments, which are transmitted by the server, via the plurality of network interfaces such that each segment is received via a network interface which transmitted the corresponding range request; and
- a reassembly unit configured to reassemble the data resource using the plurality of segments received by the communications unit,
- wherein the plurality of range requests are generated based on a current status of the plurality of network interfaces, and
- wherein the current status of the plurality of network interfaces is determined based on available bandwidth and round-trip delay of each of the plurality of network interfaces.

27. The device of claim 26, wherein the generation unit obtains metadata of the data resource and generates at least one of the plurality of range requests based on the obtained metadata of the data resource.

28. The device of claim 26, wherein each of the plurality of network interfaces is connected to the server, at least partially, by way of a different network provider and the plurality of range requests are transmitted to the server by way of the different network provider.

29. The device of claim 26, wherein at least two of the plurality of network interfaces are connected to the server, at least partially, by way of a different network provider and the plurality of range requests are transmitted to the server by way of the different network provider.

30. The device according to claim 26, wherein
- the generation unit is further configured to generate at least one additional range request, each additional range request corresponding to a data range of the data resource,
- a determining unit configured to determine an upper time limit for each at least one additional range request;
- the communication unit is further configured to transmit the at least one additional range request to the server via at least one of the plurality of network interfaces before the upper time limit determined by the determining unit,
- the communications unit is further configured to receive a plurality of additional segments, which are transmitted by the server, via the plurality of network interfaces such that each additional segment is received via a network interface which transmitted the corresponding additional range request, and
- the reassembly unit is further configured to reassemble the data resource using at least the plurality of additional segments received by the communications unit.

31. The device of claim 30, wherein the at least one additional range request is included in the plurality of range requests.

32. The device of claim 30, wherein the communication unit is further configured to determine a distribution of range requests over the plurality of network interfaces, and
wherein the generation unit is further configured to determine a size of each of the plurality of range requests.

33. The device of claim 30, wherein the plurality of range requests includes two initial range requests which are transmitted before any additional range request is transmitted.

34. The device of claim 30, wherein the determination unit is further configured to determine a limit on a number of additional range requests generated and/or transmitted before reception of a segment corresponding to a previous range request is complete.

35. The device of claim 30, wherein the upper time limit corresponds to a latest time by which the at least one additional range request is sent such that the at least one additional range request, transmitted via one of the plurality of network interfaces, is expected to be received by the server before the server finishes transmitting a segment corresponding a last received range request from the one of the plurality of network interfaces.

36. The device of claim 30, wherein the communication unit is further configured to transmit the at least one additional range request to the server no earlier than a determined lower time limit.

37. The device of claim 30, wherein the at least one additional range request is generated based on a current status of the plurality of network interfaces.

38. The device of claim 37, wherein the lower time limit and the upper time limit are updated in response to any significant variation in bandwidth or round trip delay.

39. The device of claim 30, wherein the generation unit obtains metadata of the data resource and generates at least one of the additional range requests based on the obtained metadata of the data resource.

40. The device of claim 30, wherein each of the plurality of network interfaces is connected to the server, at least partially, by way of a different network provider and the at least one additional range request is transmitted to the server by way of the different network provider.

41. The device of claim 30, wherein at least two of the plurality of network interfaces are connected to the server, at least partially, by way of a different network provider and the at least one additional range request is transmitted to the server by way of the different network provider.

42. A method of playing back segmented information, comprising:
- generating a plurality of range requests using a client having a plurality of network interfaces respectively connected to different network links, the range requests each corresponding to a data range of a data resource;
- transmitting, from the client having the plurality of network interfaces, a plurality of range requests to a server via the plurality of network interfaces;
- receiving, at the client and from the server, a plurality of segments via the plurality of network interfaces such that each segment is received via a network interface which transmitted the corresponding range request, each segment including a portion of the data resource corresponding to a corresponding range request;
- playing back the data resource using the plurality of segments,
- wherein the generating the plurality of range requests further includes:
- adjusting segment sizes of the plurality of segments by adjusting the range requests based on a current status of the plurality of network interfaces, the current status including throughput or delay of the network interfaces.

43. The method according to claim 42, wherein the playing back further comprises:
   determining current throughput conditions for each network interface;
   dynamically adapting a bitrate of the playing back based on the current throughput conditions.

44. The method according to claim 42, wherein the playing back further comprises, for any point in time within a predetermined time period:
   determining a number of bytes ready for playback;
   determining a maximum possible difference between a number of bytes ready for playback and a desired constant-rate playback bitrate; and
   determining a required startup latency for the playing back based on the determined maximum possible difference.

45. The method according to claim 42, wherein the playing back further comprises, for any point in time within a predetermined time period:
   determining a buffer requirement for the playing back of the data resource based on determining the number of received unready bytes and the number of playback-ready bytes needed for a desired constant-rate playback bitrate.

* * * * *